(12) United States Patent
Bacher et al.

(10) Patent No.: US 7,746,944 B2
(45) Date of Patent: Jun. 29, 2010

(54) ELECTRONIC TRANSMITTER/RECEIVER

(75) Inventors: Martin Bacher, Villach (AT); Stefano Marsili, Fuernitz (AT)

(73) Assignee: Infineon Technologies AG, Munich (DE)

( * ) Notice: Subject to any disclaimer, the term of this patent is extended or adjusted under 35 U.S.C. 154(b) by 1511 days.

(21) Appl. No.: 10/502,037

(22) PCT Filed: Jan. 8, 2003

(86) PCT No.: PCT/DE03/00035

§ 371 (c)(1),
(2), (4) Date: Mar. 10, 2005

(87) PCT Pub. No.: WO03/061178

PCT Pub. Date: Jul. 24, 2003

(65) Prior Publication Data

US 2005/0166127 A1    Jul. 28, 2005

(30) Foreign Application Priority Data

Jan. 21, 2002 (DE) .................. 102 02 090

(51) Int. Cl.
*H04L 5/12* (2006.01)
*H04L 23/02* (2006.01)

(52) U.S. Cl. .............. 375/265; 714/699; 714/746; 714/752; 714/756; 714/790; 711/154; 711/157

(58) Field of Classification Search ......... 375/146–147, 375/259, 262, 316, 341, 265, 241, 261; 714/790, 714/699, 746, 752, 756; 541/59, 81; 711/100, 711/154, 157

See application file for complete search history.

(56) References Cited

U.S. PATENT DOCUMENTS

| 5,029,331 | A | * | 7/1991 | Heichler et al. ............ 714/790 |
| 5,438,590 | A | | 8/1995 | Tzukerman et al. |
| 5,812,601 | A | | 9/1998 | Schramm |
| 6,131,180 | A | * | 10/2000 | Ramesh .................. 714/790 |
| 6,553,540 | B1 | * | 4/2003 | Schramm et al. ........... 714/790 |
| 6,604,216 | B1 | * | 8/2003 | Javerbring et al. ......... 714/751 |
| 7,092,455 | B2 | * | 8/2006 | Choi et al. .................. 375/301 |
| 7,251,294 | B2 | * | 7/2007 | Peting ..................... 375/316 |
| 2001/0034868 | A1 | | 10/2001 | El-Gamal et al. |
| 2002/0003885 | A1 | * | 1/2002 | Mead ...................... 380/269 |
| 2002/0006119 | A1 | * | 1/2002 | Steudle ................... 370/329 |

FOREIGN PATENT DOCUMENTS

DE        195 24 556 A1    1/1997

(Continued)

OTHER PUBLICATIONS

"HIPERLAN type 2 for broadband wireless communication", Jamshid Khun-Jush, Göran Malmgren, Peter Schramm and Johan Torsner, Ericsson Review No. 2, 2000, pp. 108-119.

(Continued)

*Primary Examiner*—Shuwang Liu
*Assistant Examiner*—James M Perez
(74) *Attorney, Agent, or Firm*—Eschweiler & Associates, LLC

(57) ABSTRACT

An electronic transmitter device has a puncturing device with two data outputs and/or an interleaver with two data inputs. An electronic receiver device has a de-interleaver with two data outputs and/or a depuncturing device with two data inputs.

19 Claims, 15 Drawing Sheets

FOREIGN PATENT DOCUMENTS

| | | |
|---|---|---|
| DE | 100 48 872 A1 | 4/2002 |
| EP | 0 301 161 B1 | 2/1989 |
| EP | 1 089 440 A1 | 4/2001 |
| EP | 1089440 A1 * | 4/2001 |

OTHER PUBLICATIONS

IEEE Std 802.11a-1999 (Supplement to IEEE Std 802.11-1999), Part 11: Wireless LAN Medium Access Control (MAC) and Physical Layer (PHY) specifications: High-speed Physical Layer in the 5 GHZ Band, 90 pgs.

Technical Specification ETSI TS 101 761-1, V1.3.1 (Dec. 2001) Broadband Radio Access Networks (BRAN): HIPERLAN Type 2, European Telecommunications Standards Institute, 2001, 88 pgs.

International Search Report, Int'l. Application PCT/DE03/00035, 3 pgs.

"Codierung zur Fehlererkennung und Fehlerkorrektur", aus dem Englischen übrsetzt, von Andreas Höfler, 4 pgs.

* cited by examiner

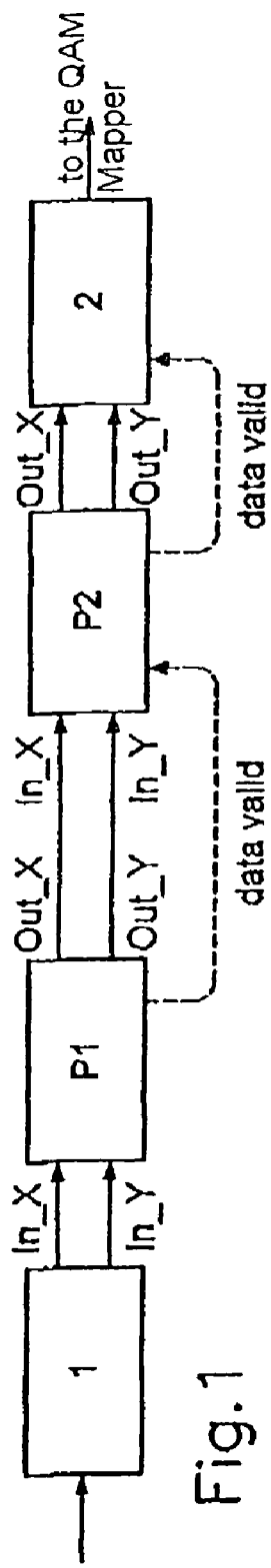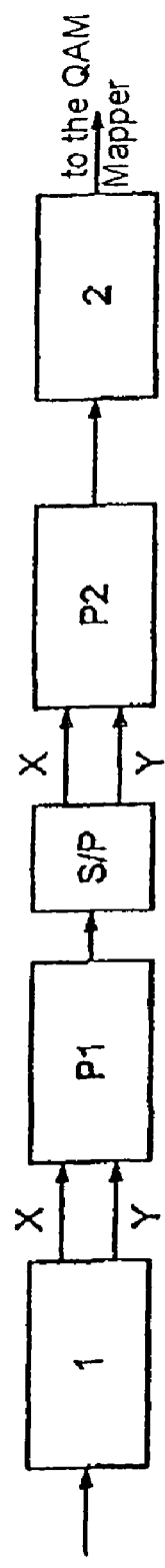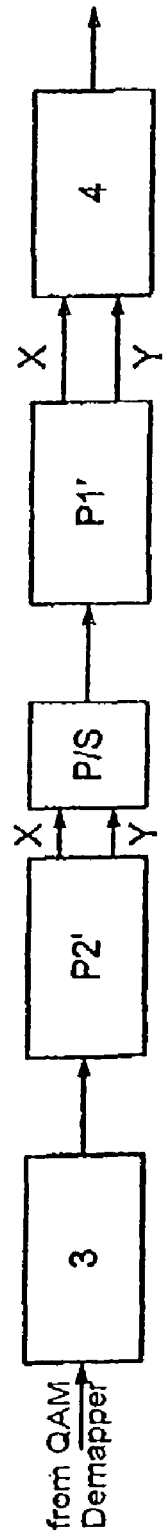

ELECTRONIC TRANSMITTER/RECEIVER

RELATED APPLICATION

This application is a national stage application of International Application No. PCT/DE03/00035 filed Jan. 8, 2003, which is entitled "ELECTRONIC TRANSMITTER/RECEIVER", which was not published in English, and claims priority to German Patent Application Serial No. 102 02 090.6, which was filed on Jan. 21, 2002, which is hereby incorporated by reference in its entirety.

FIELD OF THE INVENTION

The invention relates to an electronic transmitter device, and an electronic receiver device.

In general terms, the invention relates to electronic telecommunications transmission systems in which data puncturing and/or data interleaving is carried out, or is at least partially carried out, at the transmitter end, and data de-interleaving and/or data depuncturing is carried out, or at least partially carried out, at the receiver end.

BACKGROUND OF THE INVENTION

This takes place, for example, both within the scope of the HIPERLAN/2 (High Performance Radio Local Area Network Type 2) standard ("ETSI TS 101 761-1 Broadband Radio Access Networks; Hiperlan Type 2; Physical Layer") and within the scope of the standard "IEEE 802.11a—Part 11: Wireless LAN (WLAN) Medium Access Control and Physical Layer specifications: High-speed Physical Layer in the 5 GHz Band". In addition to said original standard, information on the HIPERLAN/2 standard can be obtained on the Internet at www.hiperlan2.com. A summary of the HIPERLAN/2 standard can also be found in the article "HIPERLAN type 2 for broadband wireless communication" by J. Khun-Jush et al. in Ericsson Review No. 2, 2000, pages 108 to 119.

In both of said standards a similar transmission fault correction scheme is defined. It contains at the transmitter end (see FIG. 2).

1) a convolutional coder 1 with the coding rate 1/2,
2) a first puncturing element P1 for reducing redundancy of 12 bits (only in the case of ETSI HIPERLAN/2),
3) a second puncturing element (P2) for selecting the coding rate (coding rates: 1/2, 9/16, 2/3, 3/4) and
4) an interleaver 2 for avoiding burst errors and, at the receiver end (see FIG. 3), a corresponding de-interleaver 3 and corresponding depuncturing elements P2', P1'.

The puncturing process with the first puncturing element P1 is defined only in the ETSI standard mentioned above. The P2 rate of 2/3 occurs only in the IEEE standard mentioned above, the P2 rate of 9/16 occurs only in the ETSI standard. The following description relates essentially to said ETSI standard and to said IEEE standard. However, it is assumed to be generally quite clear that the present invention is not restricted to the application relating to the two said standards but rather can be applied generally to all transmitter/receiver devices in which the signal which is to be transmitted is punctured and/or interleaved after it has been coded and respectively de-interleaved and depunctured before it is decoded.

The coder 1 generates two parallel output bits for each input bit. The first puncturing element P1 removes a number of these output bits of the coder 1 according to a scheme in accordance with the following table 1. Where necessary, this puncturing scheme is applied to a group of 156 coded bits.

TABLE 1

| Bit Numbering | Puncturing pattern | Transmitted sequence (after parallel/serial conversion) |
|---|---|---|
| 0-155 | X: 1111110111111<br>Y: 1111111111110 | $X_0 Y_0 X_1 Y_1 X_2 Y_2 X_3 Y_3 X_4 Y_4$<br>$X_5 Y_5 X_7 Y_6 X_8 Y_7 X_9 Y_8 X_{10} Y_9$<br>$X_{11} Y_{10} X_{12} Y_{11}$ |
| >156 | X: 1 | $X_0 Y_0$ | or in the case of IEEE Y: 1

There is a difference in speed between the inputting and the outputting of the first puncturing element P1. For a group of 13 bits, for example, the coder 1 generates 2×13 bits, while the output of the first puncturing element P1 is 24 bits long. For this reason, in order to adapt the different speeds between the coding output and the puncturing output to one another, FIFO memory elements are provided in specific sections, for example upstream or downstream of the first puncturing element P1 or even upstream of the convolutional coder 1.

A particular feature of the standards mentioned above is that each possible data rate is assigned a specific form of modulation and a specific coding rate (for the channel coding). The assignment is selected in such a way that the number of the coded bits per OFDM (Orthogonal Frequency Division Multiplexing) symbol, referred to as NCBPS, is always a multiple of the number of subchannels (48 elements). Table 3 represents the specification of the transmission modes. It becomes clear that a BPSK (Binary Phase Shift Keying) modulation and a QPSK (Quaternary Phase Shift Keying) modulation as well as two amplitude modulations (16 QAM: 16-ary Quadrature Amplitude Modulation; 64 QAM: 64-ary Quadrature Amplitude Modulation) are used. The ratio of the number of uncoded bits to the number of coded bits is referred to as the coding rate r.

In the fastest mode (54 Mbps, 64 QAM), when both the first puncturing process P1 and the second puncturing process P2 (code rate 3/4) are applied, 222 input bits for an OFDM symbol must be coded (see table 3). For this reason, there would be 2×222 bits at the output of the coder1, and 1×432 bits at the output of the first puncturing element P1.

According to the abovementioned standard definitions, the output data stream of the first puncturing element P1 is subjected again to serial/parallel conversion (S/P) before it is fed to the second puncturing element P2.

The second puncturing element P2 again removes a number of the input bits, specifically according to the scheme illustrated in the following table 2.

TABLE 2

| Code rates r | Puncturing pattern | Transmitted sequence (after parallel/serial conversion) |
|---|---|---|
| 1/2 | X: 1<br>Y: 1 | $X_0 Y_0$ |
| 9/16<br>(only with ETSI) | X: 111111110<br>X: 111101111 | $X_0 Y_0 X_1 Y_1 X_2 Y_2 X_3 Y_3 X_4 X_5$<br>$Y_5 X_6 Y_6 X_7 Y_7 Y_8$ |
| 2/3<br>(only with IEEE) | X: 11<br>Y: 10 | $X_0 Y_0 X_1$ |
| 3/4 | X: 110<br>Y: 101 | $X_0 Y_0 X_1 Y_2$ |

The second puncturing process can be based on the same assumptions regarding the difference in speed as were made above for the first puncturing process. For this reason, an FIFO memory element is required again.

The serial output data stream of the second puncturing element P2 is finally transmitted to the interleaver 2 which re-orders the bits according to a double scheme. The interleaving is defined in accordance with a double scheme only within one OFDM symbol.

In what follows, k will be the index for the coded bit before the first permutation, i will be the index after the first permutation and before the second permutation, and j will be the index after the second permutation directly before the assignment of modulation (the mapping).

The first permutation is defined by the following equation 1:

$$i = \frac{NCBPS}{16} \cdot (k \bmod 16) + \text{floor}\left(\frac{k}{16}\right) \quad (\text{Eq. 1})$$

where $k = 0, 1, \ldots, NCBPS - 1$

The function floor(.) refers to the largest natural number which does not exceed the parameter, mod is the natural modulo operator, and NCBPS refers to the number of coded bits per OFDM symbol (NCBPS=Number of Coded Bits per OFDM Symbol).

The second permutation is defined by the following equation 2:

$$j = s \times \text{floor}\left(\frac{i}{s}\right) + \left(i + NCBPS - \text{floor}\left(16 \times \frac{i}{NCBPS}\right)\right) \bmod s \quad (\text{Eq. 2})$$

where $i = 0, 1, \ldots, NCBPS - 1$

The value of s is determined by the number of coded bits per sub-carrier, NBPSC (=Number of Coded Bits Per Sub-Carrier) according to the following equation 3

$$s = \max\left(\frac{NBPSC}{2}, 1\right) \quad (\text{Eq. 3})$$

Table 3 combines the values of NBPSC and NCBPS for the various transmission modes with NUBPS (=Number of Uncoded Bits Per OFDM Symbol), specifically both for the case in which the first puncturing element P1 which is illustrated in FIG. 1 is used and for the case in which the first puncturing element P1 is not applied.

TABLE 3

Main parameters for various transmission modes

| Transmission mode (type of modulation and coding rate) | $N_{BPSC}$ | $N_{UBPS}$ P1 not applied | $N_{UBPS}$ P1 applied | $N_{CBPS}$ | Interleaver operation mode |
|---|---|---|---|---|---|
| BPSK ½ | 1 | 24 | 26 | 48 | 0 |
| BPSK ¾ | 1 | 36 | 39 | 48 | 0 |
| QPSK ½ | 2 | 48 | 52 | 96 | 1 |
| QPSK ¾ | 2 | 72 | 78 | 96 | 1 |
| 16 QAM ½ | 4 | 96 | 102 | 192 | 2 |
| 16 QAM 9/16 | 4 | 108 | 112 | 192 | 2 |
| 16 QAM ¾ | 4 | 144 | 150 | 192 | 2 |
| 64 QAM ⅔ | 6 | 192 | 198 | 288 | 3 |
| 64 QAM ¾ | 6 | 216 | 222 | 288 | 3 |

The inverse functions must be carried out at the receiver end (FIG. 3). In this case, each bit is assigned a reliability measure for the Viterbi decoder 4 which is represented by N-1 bits. It is possible to state that each bit is represented by N soft bits, one soft bit being one word (see FIG. 11).

In the depuncturing function, soft zeros are inserted in the received data stream where bits had been removed at the transmitter end. This is carried out downstream of the de-interleaver output according to tables 4 and 5 correspondingly by means of the first depuncturing element P2' which corresponds in its method of operation to a reversal of the second puncturing element P2, and by means of the second depuncturing element P1' which corresponds in its method of operation to a reversal of the first puncturing element P1.

TABLE 4

Depuncturing scheme of the first depuncturing element P2'

| Coding Rate r | Received sequence | Output sequence |
|---|---|---|
| ½ | $X_0 Y_0$ | $X: X_0$<br>$Y: Y_0$ |
| 9/16 | $X_0 Y_0 X_1 Y_1 X_2 Y_2 X_3 Y_3 X_4 X_5$<br>$Y_5 X_6 Y_6 X_7 Y_7 Y_8$ | $X: X_0 X_1 X_2 X_3 X_4 X_5$<br>$X_6 X_7 0$<br>$Y: Y_0 Y_1 Y_2 Y_3 0 Y_5 Y_6$<br>$Y_7 Y_8$ |
| ⅔ | $X_0 Y_0 X_1$ | $X: X_0 X_1$<br>$Y: Y_0 0$ |
| ¾ | $X_0 Y_0 X_1 Y_2$ | $X: X_0 X_1 0$<br>$Y: Y_0 0 Y_2$ |

TABLE 5

Depuncturing scheme of the second depuncturing element P1'

| Bit numbering | Received sequence | Output sequence |
|---|---|---|
| 0-155 | $X_0 Y_0 X_1 Y_1 X_2 Y_2 X_3 Y_3 X_4$<br>$Y_4 X_5 Y_5 X_7 Y_6 X_8 Y_7 X_9 Y_8$<br>$X_{10} Y_9 X_{11} Y_{10} X_{12} Y_{11}$ | $X: X_0 X_1 X_2 X_3 X_4 X_5$<br>$0 X_7 X_8 X_9 X_{10} X_{11} X_{12}$<br>$Y: Y_0 Y_1 Y_2 Y_3 Y_4 Y_5$<br>$Y_6 Y_7 Y_8 Y_9 Y_{10} Y_{11} 0$ |
| >156 | $X_0 Y_0$ | $X: X_0$<br>$Y: Y_0$ |

As at the transmitter end, the same problems also arise here in terms of latency and speed adaptation.

Let us concentrate now on the first permutation (Equation 1). In table 6, the 288 input/output bits for the 64 QAM mode are illustrated.

TABLE 6

Mode #3

| k | i |
|---|---|
| 0 | 0 |
| 1 | 18 |
| 2 | 36 |
| 3 | 54 |
| 4 | 72 |
| 5 | 90 |
| 6 | 108 |
| 7 | 126 |
| 8 | 144 |
| 9 | 162 |
| 10 | 180 |
| 11 | 198 |
| 12 | 216 |
| 13 | 234 |
| 14 | 252 |
| 15 | 270 |

TABLE 6-continued

Mode #3

| k | i |
|---|---|
| 16 | 1 |
| 17 | 19 |
| 18 | 37 |
| 19 | 55 |
| 20 | 73 |
| 21 | 91 |
| 22 | 109 |
| 23 | 127 |
| 24 | 145 |
| 25 | 163 |
| 26 | 181 |
| 27 | 199 |
| 28 | 217 |
| 29 | 235 |
| 30 | 253 |
| 31 | 271 |
| 32 | 2 |
| 33 | 20 |
| 34 | 38 |
| 35 | 56 |
| 36 | 74 |
| 37 | 92 |
| 38 | 110 |
| 39 | 128 |
| 40 | 146 |
| 41 | 164 |
| 42 | 182 |
| 43 | 200 |
| 44 | 218 |
| 45 | 236 |
| 46 | 254 |
| 47 | 272 |
| 48 | 3 |
| 49 | 21 |
| 50 | 39 |
| 51 | 57 |
| 52 | 75 |
| 53 | 93 |
| 54 | 111 |
| 55 | 129 |
| 56 | 147 |
| 57 | 165 |
| 58 | 183 |
| 59 | 201 |
| 60 | 219 |
| 61 | 237 |
| 62 | 255 |
| 63 | 273 |
| 64 | 4 |
| 65 | 22 |
| 66 | 40 |
| 67 | 58 |
| 68 | 76 |
| 69 | 94 |
| 70 | 112 |
| 71 | 130 |
| 72 | 148 |
| 73 | 166 |
| 74 | 184 |
| 75 | 202 |
| 76 | 220 |
| 77 | 238 |
| 78 | 256 |
| 79 | 274 |
| 80 | 5 |
| 81 | 23 |
| 82 | 41 |
| 83 | 59 |
| 84 | 77 |
| 85 | 95 |
| 86 | 113 |
| 87 | 131 |
| 88 | 149 |
| 89 | 167 |
| 90 | 185 |

TABLE 6-continued

Mode #3

| k | i |
|---|---|
| 91 | 203 |
| 92 | 221 |
| 93 | 239 |
| 94 | 257 |
| 95 | 275 |
| 96 | 6 |
| 97 | 24 |
| 98 | 42 |
| 99 | 60 |
| 100 | 78 |
| 101 | 96 |
| 102 | 114 |
| 103 | 132 |
| 104 | 150 |
| 105 | 168 |
| 106 | 186 |
| 107 | 204 |
| 108 | 222 |
| 109 | 240 |
| 110 | 258 |
| 111 | 276 |
| 112 | 7 |
| 113 | 25 |
| 114 | 43 |
| 115 | 61 |
| 116 | 79 |
| 117 | 97 |
| 118 | 115 |
| 119 | 133 |
| 120 | 151 |
| 121 | 169 |
| 122 | 187 |
| 123 | 205 |
| 124 | 223 |
| 125 | 241 |
| 126 | 259 |
| 127 | 277 |
| 128 | 8 |
| 129 | 26 |
| 130 | 44 |
| 131 | 62 |
| 132 | 80 |
| 133 | 98 |
| 134 | 116 |
| 135 | 134 |
| 136 | 152 |
| 137 | 170 |
| 138 | 188 |
| 139 | 206 |
| 140 | 224 |
| 141 | 242 |
| 142 | 260 |
| 143 | 278 |
| 144 | 9 |
| 145 | 27 |
| 146 | 45 |
| 147 | 63 |
| 148 | 81 |
| 149 | 99 |
| 150 | 117 |
| 151 | 135 |
| 152 | 153 |
| 153 | 171 |
| 154 | 189 |
| 155 | 207 |
| 156 | 225 |
| 157 | 243 |
| 158 | 261 |
| 159 | 279 |
| 160 | 10 |
| 161 | 28 |
| 162 | 46 |
| 163 | 64 |
| 164 | 82 |
| 165 | 100 |

TABLE 6-continued

Mode #3

| k | i |
|---|---|
| 166 | 118 |
| 167 | 136 |
| 168 | 154 |
| 169 | 172 |
| 170 | 190 |
| 171 | 208 |
| 172 | 226 |
| 173 | 244 |
| 174 | 262 |
| 175 | 280 |
| 176 | 11 |
| 177 | 29 |
| 178 | 47 |
| 179 | 65 |
| 180 | 83 |
| 181 | 101 |
| 182 | 119 |
| 183 | 137 |
| 184 | 155 |
| 185 | 173 |
| 186 | 191 |
| 187 | 209 |
| 188 | 227 |
| 189 | 245 |
| 190 | 263 |
| 191 | 281 |
| 192 | 12 |
| 193 | 30 |
| 194 | 48 |
| 195 | 66 |
| 196 | 84 |
| 197 | 102 |
| 198 | 120 |
| 199 | 138 |
| 200 | 156 |
| 201 | 174 |
| 202 | 192 |
| 203 | 210 |
| 204 | 228 |
| 205 | 246 |
| 206 | 264 |
| 207 | 282 |
| 208 | 13 |
| 209 | 31 |
| 210 | 49 |
| 211 | 67 |
| 212 | 85 |
| 213 | 103 |
| 214 | 121 |
| 215 | 139 |
| 216 | 157 |
| 217 | 175 |
| 218 | 193 |
| 219 | 211 |
| 220 | 229 |
| 221 | 247 |
| 222 | 265 |
| 223 | 283 |
| 224 | 14 |
| 225 | 32 |
| 226 | 50 |
| 227 | 68 |
| 228 | 86 |
| 229 | 104 |
| 230 | 122 |
| 231 | 140 |
| 232 | 158 |
| 233 | 176 |
| 234 | 194 |
| 235 | 212 |
| 236 | 230 |
| 237 | 248 |
| 238 | 266 |
| 239 | 284 |
| 240 | 15 |
| 241 | 33 |
| 242 | 51 |
| 243 | 69 |
| 244 | 87 |
| 245 | 105 |
| 246 | 123 |
| 247 | 141 |
| 248 | 159 |
| 249 | 177 |
| 250 | 195 |
| 251 | 213 |
| 252 | 231 |
| 253 | 249 |
| 254 | 267 |
| 255 | 285 |
| 256 | 16 |
| 257 | 34 |
| 258 | 52 |
| 259 | 70 |
| 260 | 88 |
| 261 | 106 |
| 262 | 124 |
| 263 | 142 |
| 264 | 160 |
| 265 | 178 |
| 266 | 196 |
| 267 | 214 |
| 268 | 232 |
| 269 | 250 |
| 270 | 268 |
| 271 | 286 |
| 272 | 17 |
| 273 | 35 |
| 274 | 53 |
| 275 | 71 |
| 276 | 69 |
| 277 | 107 |
| 278 | 125 |
| 279 | 143 |
| 280 | 161 |
| 281 | 179 |
| 282 | 197 |
| 283 | 215 |
| 284 | 233 |
| 285 | 251 |
| 286 | 269 |
| 287 | 287 |

From Table 6 it is clear that if the input bits are written in columns into a matrix with 16 rows and 18 columns, the bits can then be read in rows from the top in the correct sequence. In addition, said column size 18 is precisely three times the bit number per carrier, or in other words precisely the magnitude which is required to carry out the second permutation. It is also possible to show that precisely the same principle can be applied to the other modes. It is sufficient to reduce the number of columns correspondingly to 12, 6 or 3 for 16 QAM, QPSK or BPSK.

The principle of the first permutation is summarized in FIG. 4. With the described method of execution, up to 288 cycles are required to write the contents of one complete OFDM symbol.

In summary it is therefore possible to state the following with respect to the prior art:
1) The delay which is introduced by the system according to the prior art is high since for puncturing a bit number is required which is twice as high as the number of input bits (maximum 432 cycles/OFDM symbol), and since all the input bits have to be read serially for interleaving (maximum 288 cycles/OFDM symbol). The latency is a critical parameter for the configuration of burst transmission systems such as, for example, WLAN.

2) FIFO elements are required in order to compensate the speed differences between the coder 1 and the first puncturing element P1 and between the first puncturing element P1 and the second puncturing element P2. In addition, FIFO elements are required in order to compensate the speed difference between the parallel inputting of the second puncturing element P2 and the serial inputting of the interleaver 2.

3) The clock system has to be fast enough in order to be able to conclude everything within one OFDM symbol. In an implementation with a clock frequency of 80 MHz, two OFDM symbols, and consequently two bit bursts which are supplied to the coder 1, are 3.6 µs*80 MHz=288 clock cycles away from one another (worst case with short guard interval with HIPERLAN; typical case: 4.0 µs*80 MHz=320 clock cycles). During this time, the input data must be read and stored somewhere. After this, it has to be read out in the correct sequence (Equation 1) and the second permutation (Equation 2) has to be carried out. The puncturing elements P1, P2 and the interleaver 2 take up to 432 clock cycles in order to read all the input bits. For this reason it is not possible to complete all the operations within one OFDM symbol, for which reason, according to the prior art, what are referred to as pipelines are produced for even-numbered and odd-numbered OFDM symbols by doubling the circuit or even multiplying it further.

SUMMARY OF THE INVENTION

The invention is therefore based on the object of making available electronic transmitter devices having a puncturing device and/or an interleaver, electronic receiver devices having a de-interleaver and/or a depuncturing device, and a telecommunications transmission system having a puncturing device and/or an interleaver and/or a de-interleaver and/or a depuncturing device, which overcome the speed difference problems during data processing which have been explained above with respect to the prior art.

This object is achieved according to the invention by means of an electronic transmitter device and by means of an electronic transmitter device.

The speed differences which are present according to the prior art are overcome with the devices according to the invention by means of the parallelization of the data streams.

The term "telecommunications transmission system" is to be understood quite generally as a system for transmitting any desired information, i.e. for example language, images, data etc.

BRIEF DESCRIPTION OF THE DRAWINGS

Exemplary embodiments of the invention are explained below with reference to the figures, in which:

FIG. 1 shows an exemplary embodiment of a transmitter device according to the invention, FIG. 2 shows a transmitter device according to the prior art, FIG. 3 shows a receiver device according to the prior art, FIG. 21 is a schematic view of an exemplary embodiment of the reading phase during the inversion of the first permutation in the de-interleaver.

DETAILED DESCRIPTION OF THE INVENTION

It is possible to reformulate the equations defined in the abovementioned standards in such a way that the entire data path can be processed in two parallel lines. FIG. 1 shows a corresponding block circuit diagram for the transmitter end.

Figure 5:
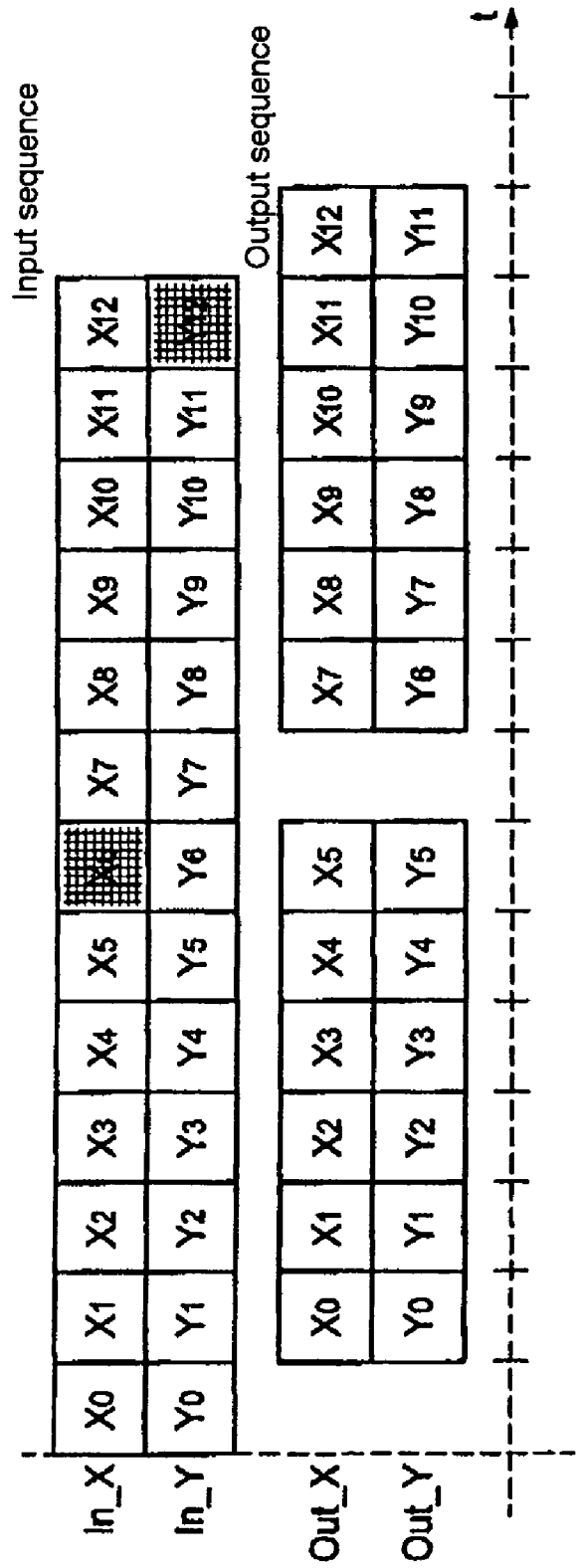
FIG. 5 shows an execution scheme for the execution of a first puncturing process according to the invention.

From FIG. 5 it is apparent that the first puncturing which is to be carried out by the first puncturing element P1 can be implemented in a parallel fashion. If the parallel outputs Out_X and Out_Y are read alternately, the original sequence is obtained. The only difference is that in this case there is also an empty location which lies precisely in the center, in terms of the timing, during the output sequence of FIG. 5. The hardware block which follows the first puncturing element, i.e. the second puncturing element P2, must be informed by means of a signal, referred to below as "data_valid signal", that it is not intended to include the empty location.

In the fastest mode with 222 input bits, the coder 1 generates 2×222 bits, and the output length remains 2×222 (with 2×6 gaps). One possible way of implementing the described method of operation in terms of hardware is the circuit illustrated in FIG. 6.

Figure 6:
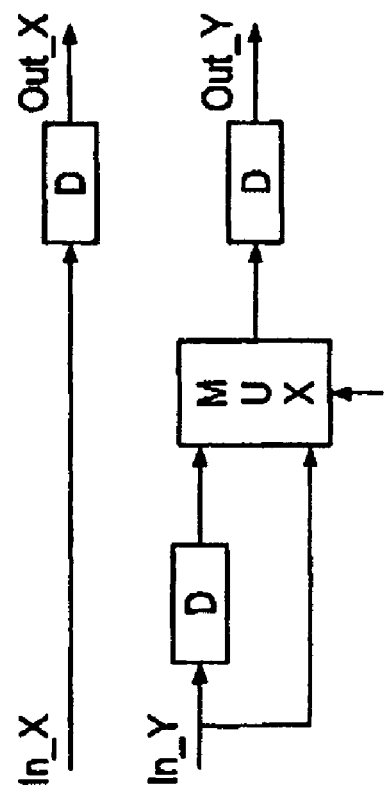
FIG. 6 shows an exemplary embodiment of the circuit of a first puncturing element according to the invention.

In the circuit in FIG. 6, the first data input IN_X of the first puncturing element P1 which is illustrated there is connected via a first 1-step delay register D to the first data output Out_X of the first puncturing element P1 (upper data line in FIG. 6). The lower data line of FIG. 6 shows the logic linking of the second data input IN_Y of the first puncturing element P1 with its second data output Out_Y. The essential element in this connection is a multiplexer MUX at whose first input the data which is incoming into the first puncturing element P1 via the second data input IN_Y of the first puncturing element P1 is made available after passing through a 1-step delay register D. In parallel with this, the data which is incoming into the first puncturing element P1 via the second data input IN_Y of the first puncturing element P1 is also fed directly to a second input of the multiplexer MUX.

The multiplexer MUX has an output which is electrically connected to the second data output Out_Y of the first puncturing element P1 via a further 1-step delay register D.

Figure 7:
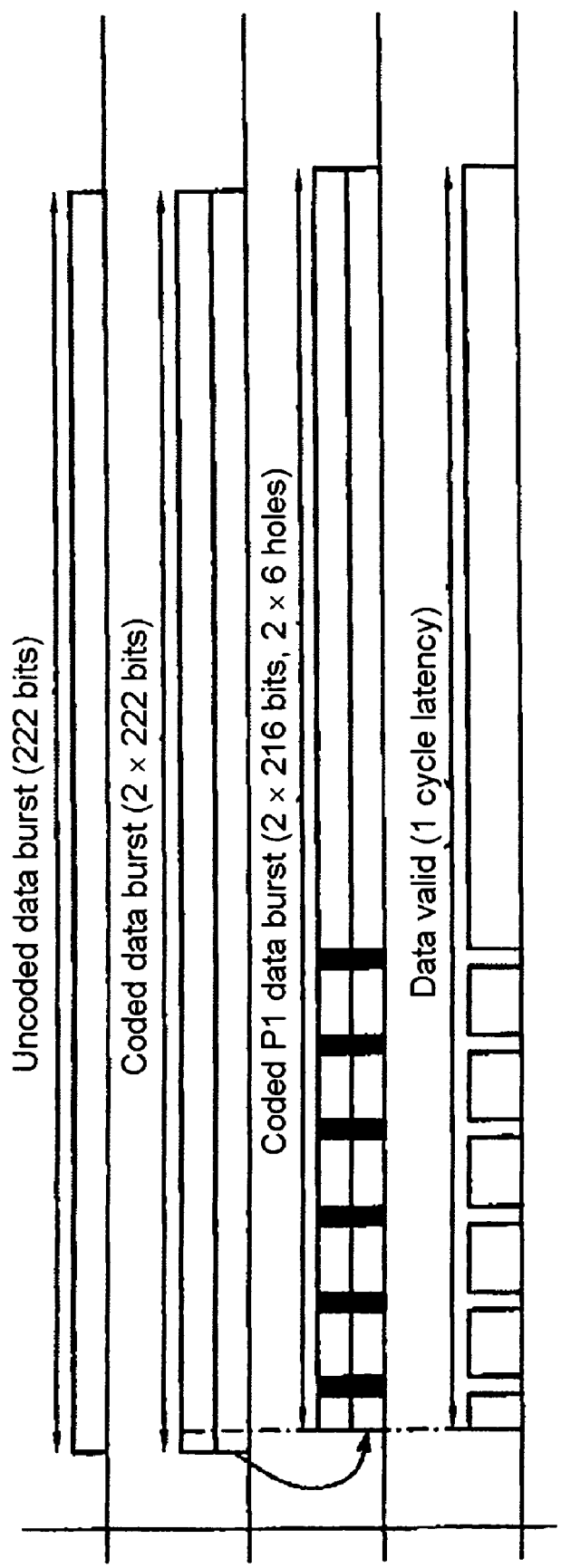
FIG. 7 shows the time sequence diagram associated with the circuit in FIG. 6.

As is readily apparent, in the circuit example according to FIG. 6 it is possible to select when the bit pair is to be removed by suitably setting the multiplexer MUX and suitably setting up the 1-step delay registers D. FIG. 7 shows the corresponding time sequence diagram. The data bits of an OFDM symbol (222) are transmitted in a single burst to the convolutional coder 1. The latter generates a burst of the same length on two parallel lines. The first puncturing element P1 re-orders the two coding outputs and signals the positions of the six gaps to the second puncturing element P2 by setting the data_valid signal to LOW.

FIFO memory elements are no longer required with such transmitter devices according to the invention because the coder 1 and the puncturing units P1, P2 which have the first puncturing element P1 and the second puncturing element P2, operate at the same speed. In addition, the time required to execute the transmitter-end processing operation is greatly reduced (222 cycles). For this reason, when applying the invention it is possible to use a single structure with a clock frequency of 62 MHz instead of 120 according to the prior art, that is to say "pipelines" are no longer required.

Figure 8:
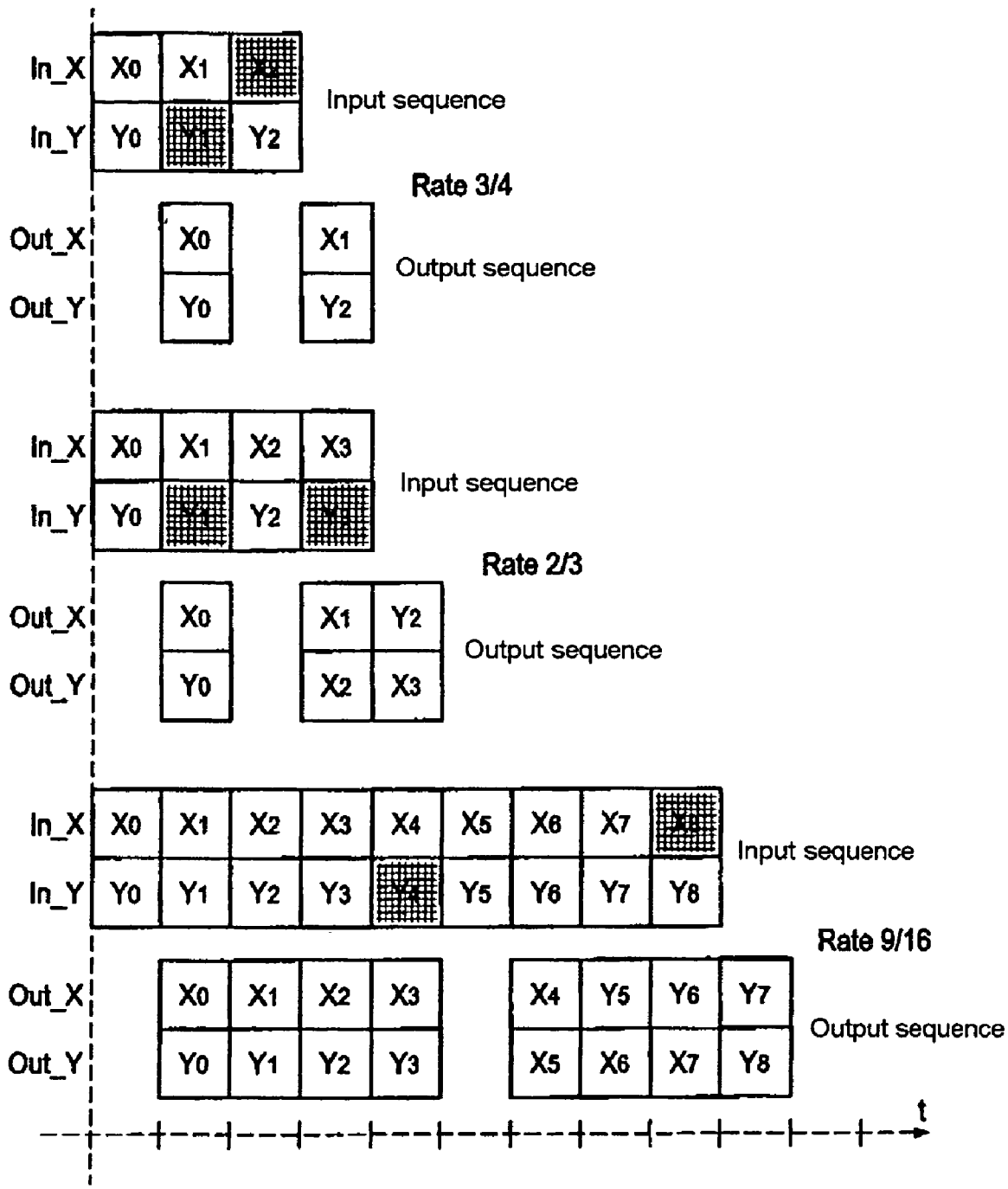
FIG. 8 shows an execution scheme for the execution of a second puncturing process according to the invention.

It is then possible to apply the same principle to the second puncturing element P2. In FIG. 8, all the possible puncturing schemes are illustrated, but the coding rate 1/2 is absent because this means "do nothing". The latency which is introduced by this unit, that is to say by the second puncturing element P2, is again equal to one clock cycle, while the time which is necessary to execute the operation corresponds to the number of input data bits (222 at maximum).

Figure 9:
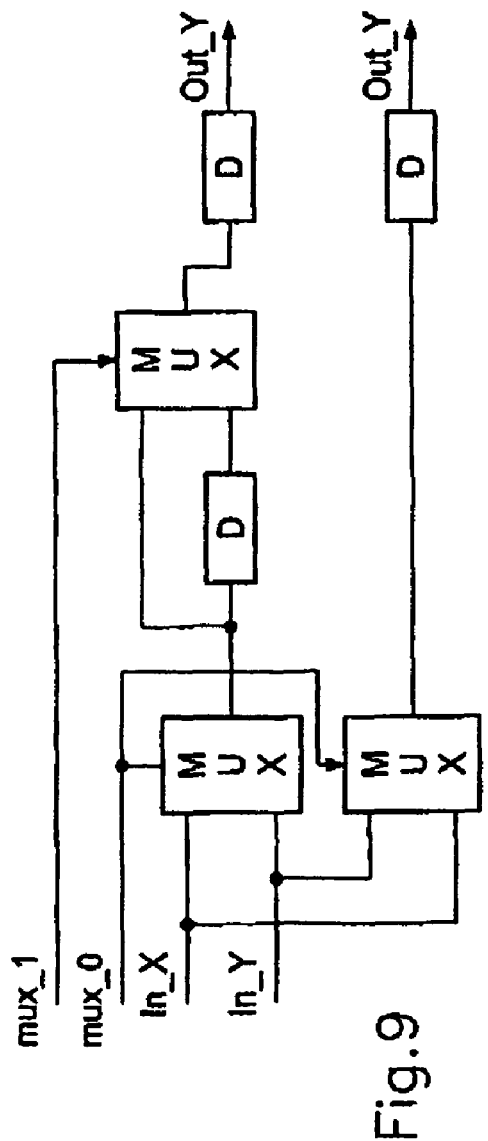
FIG. 9 shows an exemplary embodiment of the circuit of a second puncturing element according to the invention.

FIG. 9 shows an example of an inventive implementation of the second puncturing element P2. In the circuit illustrated in FIG. 9, the second puncturing element P2 has three multiplexers MUX, each of which has in turn two inputs and one output and is also connected to a control line mux_0, mux_1.

The first data input IN_X of the second puncturing element P2 is directly electrically connected both to the first input of the first multiplexer of the second puncturing element P2 and to the first input of the second multiplexer of the second puncturing element P2. The second data input IN_Y of the second puncturing element P2 is directly electrically connected both to the second input of the first multiplexer of the second puncturing element P2 and to the second input of the second multiplexer of the second puncturing element P2.

The output of the first multiplexer of the second puncturing element P2 is directly electrically connected to the first input of the third multiplexer of the second puncturing element P2. In parallel with this, the output of the first multiplexer of the second puncturing element P2 is also electrically connected via a 1-step delay register D to the second input of the third multiplexer of the second puncturing element P2.

The output of the third multiplexer of the second puncturing element P2 is electrically connected via a 1-step delay register D to the first data output Out_X of the second puncturing element P2. The output of the second multiplexer of the second puncturing element P2 is electrically connected via a further 1-step delay register D to the second data output Out_Y of the second puncturing element P2.

From FIG. 9 it becomes clear that the desired output sequences can easily be achieved by suitably controlling the multiplexers MUX and suitably setting up the 1-step delay registers D.

Figure 10:
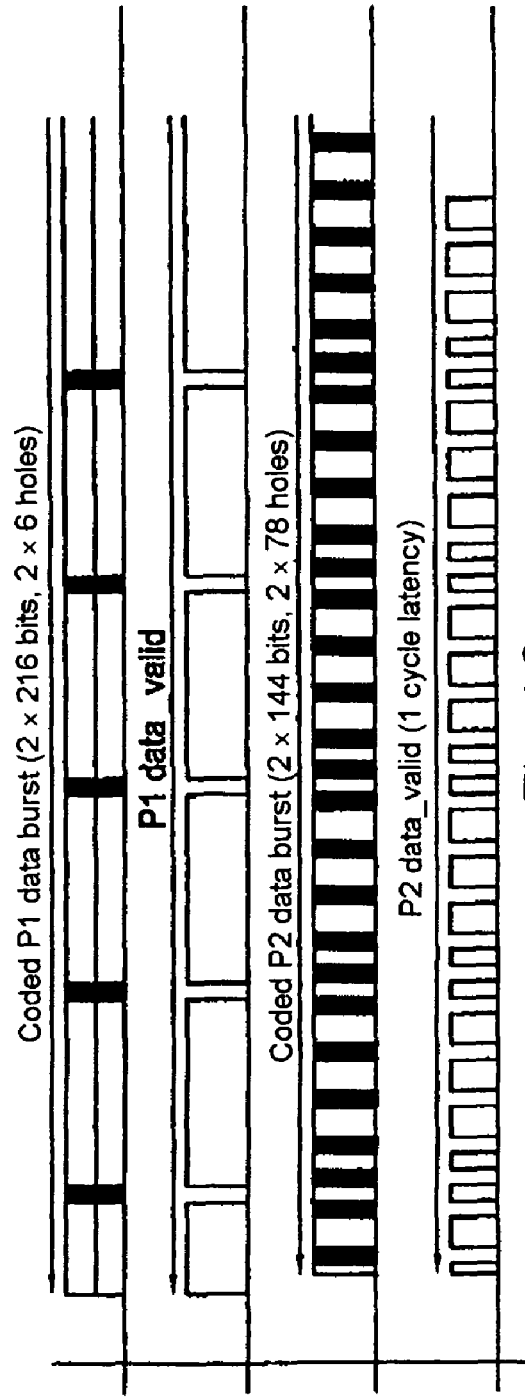
FIG. 10 shows the time sequence diagram which is associated with the circuit in FIG. 9.

In the timing diagram (illustrated in FIG. 10) for the second puncturing process, the first part of the outputting is expanded according to FIG. 7. The outputting of the second puncturing element P2 for the 3/4 rate is illustrated in FIG. 10. The gaps which have already been introduced by the first puncturing element P1 remain in the same position, but the newly introduced gaps are also shown. The data_valid signal is set for both types of gaps LOW.

Finally, the interleaver 2 must also be configured in such a way that it is capable of processing two parallel inputs instead of 1. However, before this is described in more detail below, the new method of depuncturing at the receiver end will firstly be treated.

Figure 11:
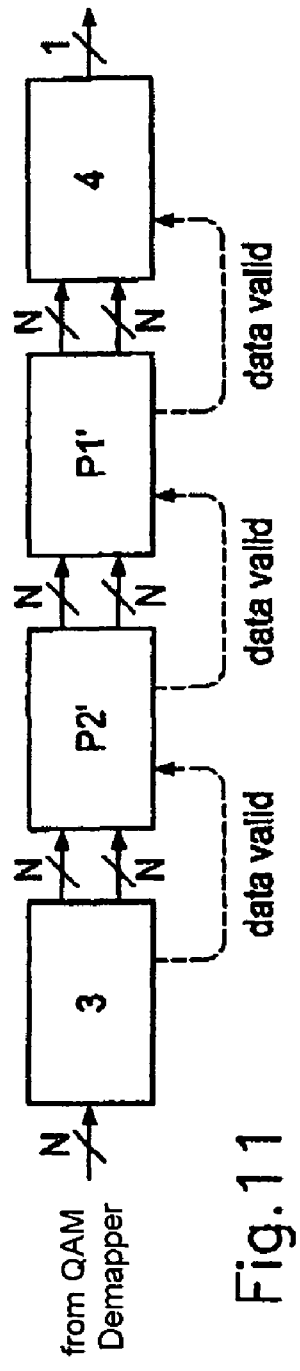
FIG. 11 shows an exemplary embodiment of a receiver device according to the invention.
Figure 12:
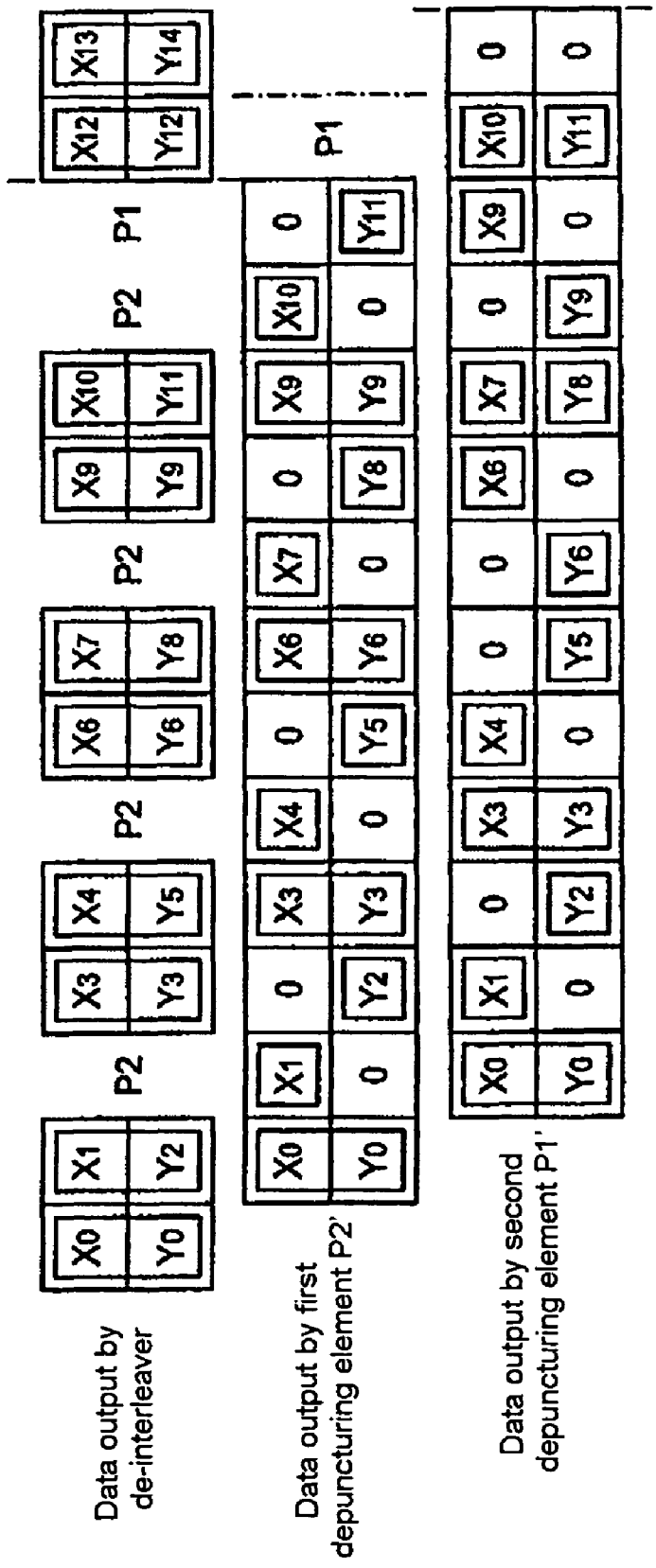
FIG. 12 shows an example of a depuncturing function in accordance with the invention for the coding rate 3/4.

The inventive method of depuncturing at the receiver end functions in principle in precisely the same way as the inventive method of puncturing at the transmitter end. FIG. 11 shows a corresponding block circuit diagram with de-interleaver 3, first depuncturing element P2', second depuncturing element P1' and Viterbi decoder 4. In FIG. 12, the depuncturing function for the coding rate 3/4 is illustrated, soft zeros being inserted in place of the missing bits. It is a precondition here that the de-interleaver 3 is already capable of inserting gaps at the end of a depuncturing group. The de-interleaver 3 therefore already carries out the FIFO function in order to adapt the various input/output speeds to one another, and there is no need for an additional separate memory. For more precise statements in this respect, reference is made to the explanations given below which relate to the inventive method of operation of the de-interleaver 3.

Even if the first puncturing element P1 is also used, the de-interleaver 3 must ensure that a gap is also left at the end of a first puncturing group. The first depuncturing element P2' firstly fills in the gaps which are associated with the second puncturing group, and finally the second depuncturing element P1' fills in the remaining gaps. All the bursts in each section have a length which is equal to the number of uncoded bits. For this reason, the latency for the first depuncturing element P2' has one cycle, and one further cycle for the second depuncturing element P1'.

Figure 14:
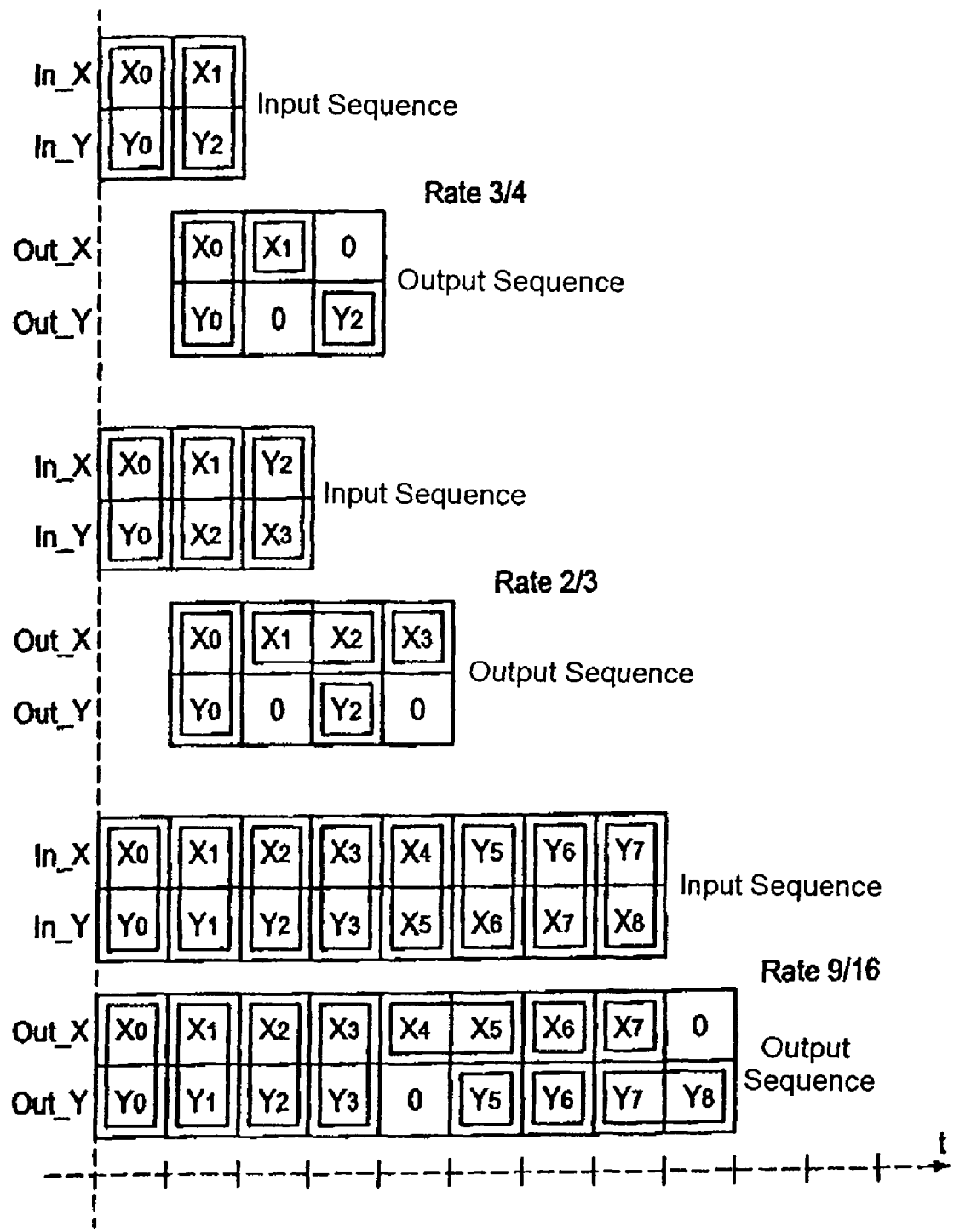
FIG. 14 shows examples of the first depuncturing function in accordance with the invention for various coding rates.

A case with the 3/4 rate was illustrated in FIG. 12 but the principle can also be expanded to all other coding rates. This is shown for the first depuncturing element P2' in FIG. 14.

Figure 13A:
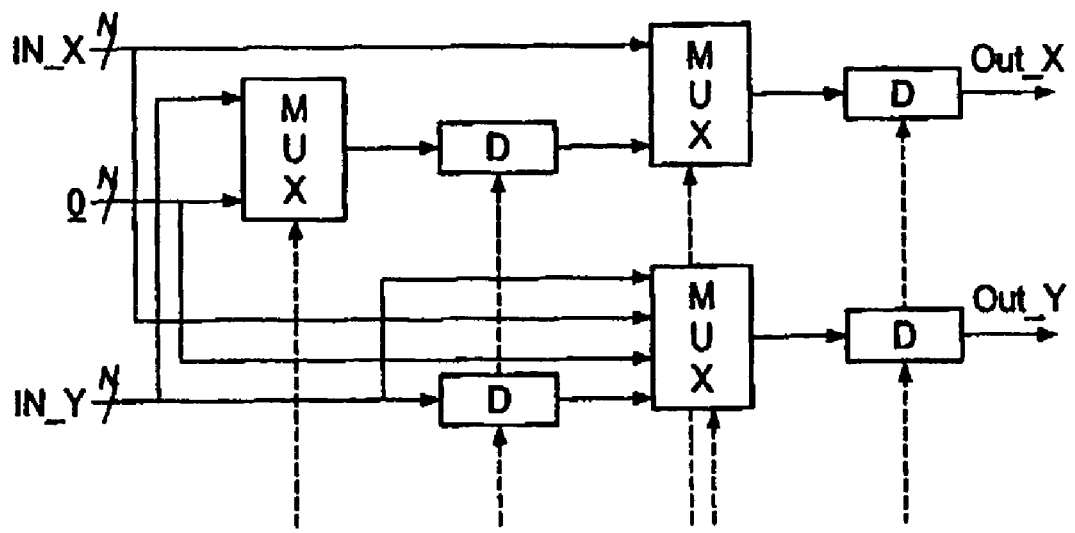
FIG. 13a shows an exemplary embodiment of the circuit of a first depuncturing element according to the invention.
Figure 13B:
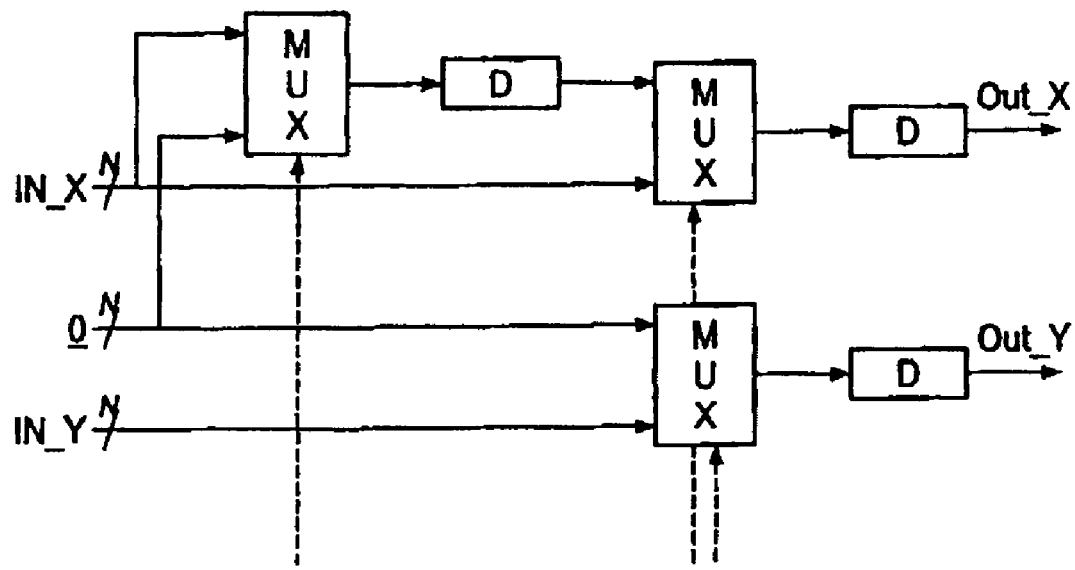
FIG. 13b shows an exemplary embodiment of the circuit of a second depuncturing element according to the invention.

An example of a hardware implementation of the first depuncturing element P2' is illustrated in FIG. 13a, and FIG. 13b shows an example of a hardware implementation of the second depuncturing element P1'. In the circuit according to FIG. 13a/13b, the inputting/outputting is represented by N soft bits for the following Viterbi decoder 4.

In the exemplary embodiment of the first depuncturing element P2' according to FIG. 13a, the first depuncturing element P2' has a first and a second multiplexer MUX, each with two inputs and one output, as well as a third multiplexer MUX with four inputs and one output.

In each case a 1-step delay register D is connected between the output of the first multiplexer and one input of the second multiplexer, between the output of the second multiplexer and a first data output Out_X of the first depuncturing element P2', between the output of the third multiplexer and a second data output Out_Y of the first depuncturing element P2', and between a first data input IN_Y of the first depuncturing element P2' and an input of the third multiplexer.

The first data input IN_Y of the first depuncturing element P2' is also directly electrically connected to an input of the first multiplexer and to a further input of the third multiplexer. The second data input IN_X of the first depuncturing element P2' is directly electrically connected to the further input of the second multiplexer and to the third input of the third multiplexer. The respectively remaining input of the first multiplexer and of the third multiplexer is connected to a line on which soft zeros are made available.

In the exemplary embodiment of the second depuncturing element P1' according to FIG. 13b, the second depuncturing element P1' has three multiplexers MUX, each with two inputs and one output. In each case a 1-step delay register D is connected between the output of the first multiplexer and an input of the second multiplexer, between the output of the second multiplexer and the first data output Out_X of the second depuncturing element P1', and between the output of the third multiplexer and the second data output Out_Y of the second depuncturing element P1'. The first data input IN_X of the second depuncturing element P1' is directly electrically connected to an input of the first multiplexer and to the further input of the second multiplexer. The second data input IN_Y of the second depuncturing element P1' is directly electrically connected to an input of the third multiplexer. The respectively remaining input of the first multiplexer and of the third multiplexer is connected to a line on which soft zeros are made available.

From FIGS. 13a and 13b it becomes apparent that the desired output sequences can easily be achieved by suitably controlling the multiplexers MUX and suitably setting up the 1-step delay registers D.

There will now be a more precise description of exemplary embodiments of the interleavers 2 and de-interleavers 3 in the transmitter/receiver devices according to the invention.

Reference is made to FIG. 1 with respect to the transmitter-end position of the interleaver 2. It will also be recalled that the second puncturing element P2 is capable of making available the even-numbered bit according to Equation 1 at its first data output Out_X, and the odd-numbered bits according to Equation 1 at its second data output Out_Y.

In order to explain exemplary embodiments of interleavers according to the invention, two new possible implementations of the first permutation scheme will be illustrated in what follows. The first implementation is realized using registers, and understanding of the first implementation is useful in order to understand the second implementation possibility, explained further below, by means of an RAM.

Figure 4:
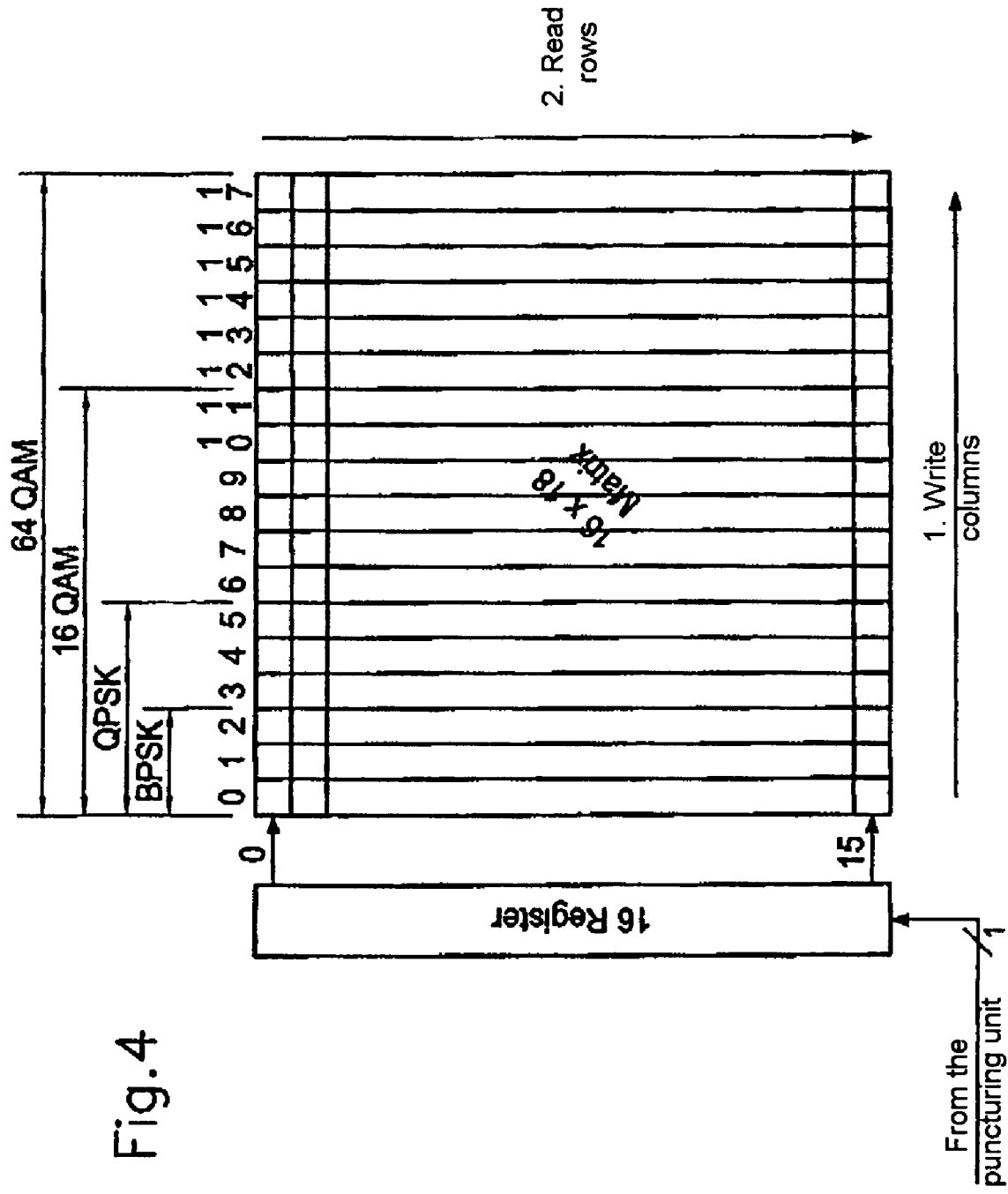
FIG. 4 shows the principle of the first permutation.
Figure 15:
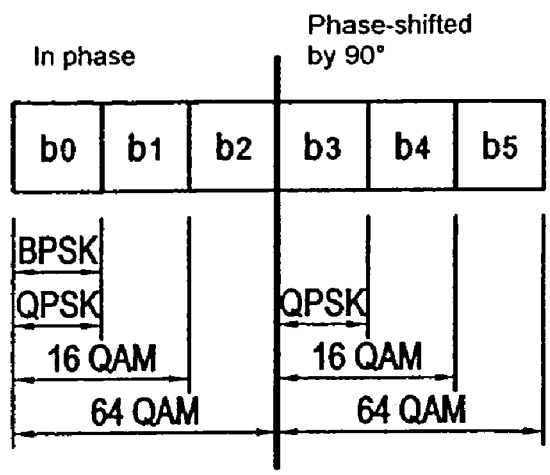
FIG. 15 shows a modified bit mapping.

Firstly, the column carrier diagram in FIG. 4 is modified so that the new diagram according to FIG. 15 is produced. The result of this is that the three groups of six rows are always associated with the same carriers independently of the selected transmission mode.

Figure 16:
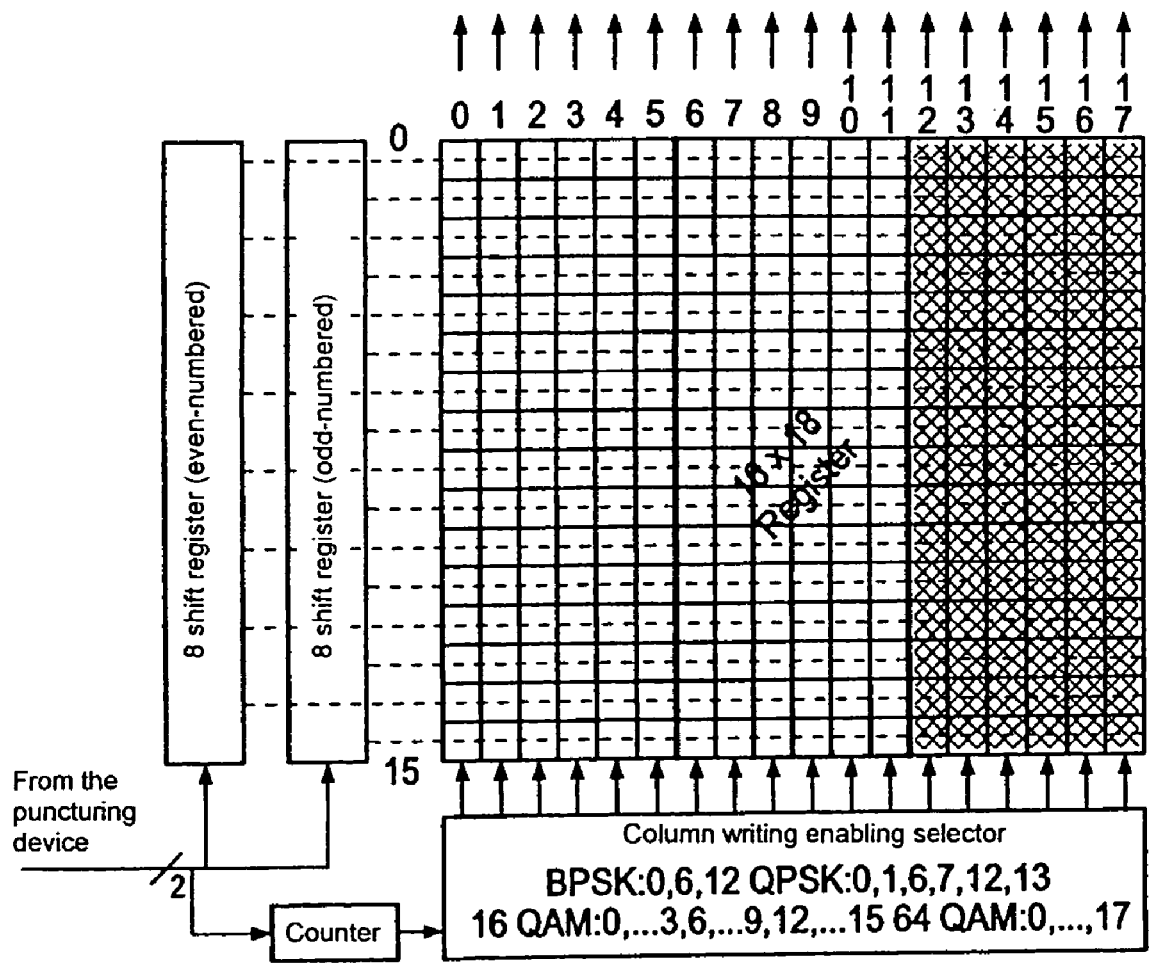
FIG. 16 shows an exemplary embodiment of an interleaver according to the invention with registers.

FIG. 16 shows, as an example, an interleaver embodiment with registers. This exemplary embodiment according to FIG. 16 contains two rows of 8-bit shift registers. The second puncturing element P2 provides the interleaver 2 with even-numbered bits (Out_X) and odd-numbered bits (Out_Y) which are shifted within the even-numbered/odd-numbered register group. After 2×8 inputs, the registers are full. It is then possible to shift a complete column of the matrix of the matrix register which is present in addition to the shift registers and which is a 16×18 matrix register in the present exemplary embodiment, and then start again with the filling of the even-numbered/odd-numbered shift registers. Depending on the selected mode, the columns (0, 12, 6) . . . (0, 1, 2 . . . , 17) are each correspondingly written for BPSK . . . 64 QAM. For the 64 QAM mode, the phase of writing into the matrix register requires 18 (number of columns)×8 (required time for filling the shift registers)=144 cycles. Consequently, this time is halved in comparison with the time which is required for the serial implementation which is specified in the above-mentioned standards.

For the reading phase, the matrix rows then have to be read. A row always contains the bits which are required to map the three QAM carriers. It is possible to apply the second permutation (Equation 2) to the complete row once, or to execute the same permutation on the three carriers serially three times. The reading phase correspondingly lasts either for 16 or 48 cycles. The total time which is required for the interleaving in the last-mentioned case is 144+48=192 cycles. For this reason, only a single interleaver 2 with a clock frequency of higher than 53.3 MHz has to be used. In the example mentioned with a clock frequency of 80 MHz, 96 cycles are still free. These free cycles may be used for the case in which the puncturing device P1, P2 makes available the input bits with gaps between them. This is precisely the case which has already been described with respect to the above exemplary embodiment of the puncturing device P1, P2 according to the invention, in which the data which is input at the interleaver 2 is distributed over 222 cycles. The entire interleaving time is then 270 cycles long, the minimum clock frequency at which pipelines can be avoided being 75 MHz.

Figure 17:
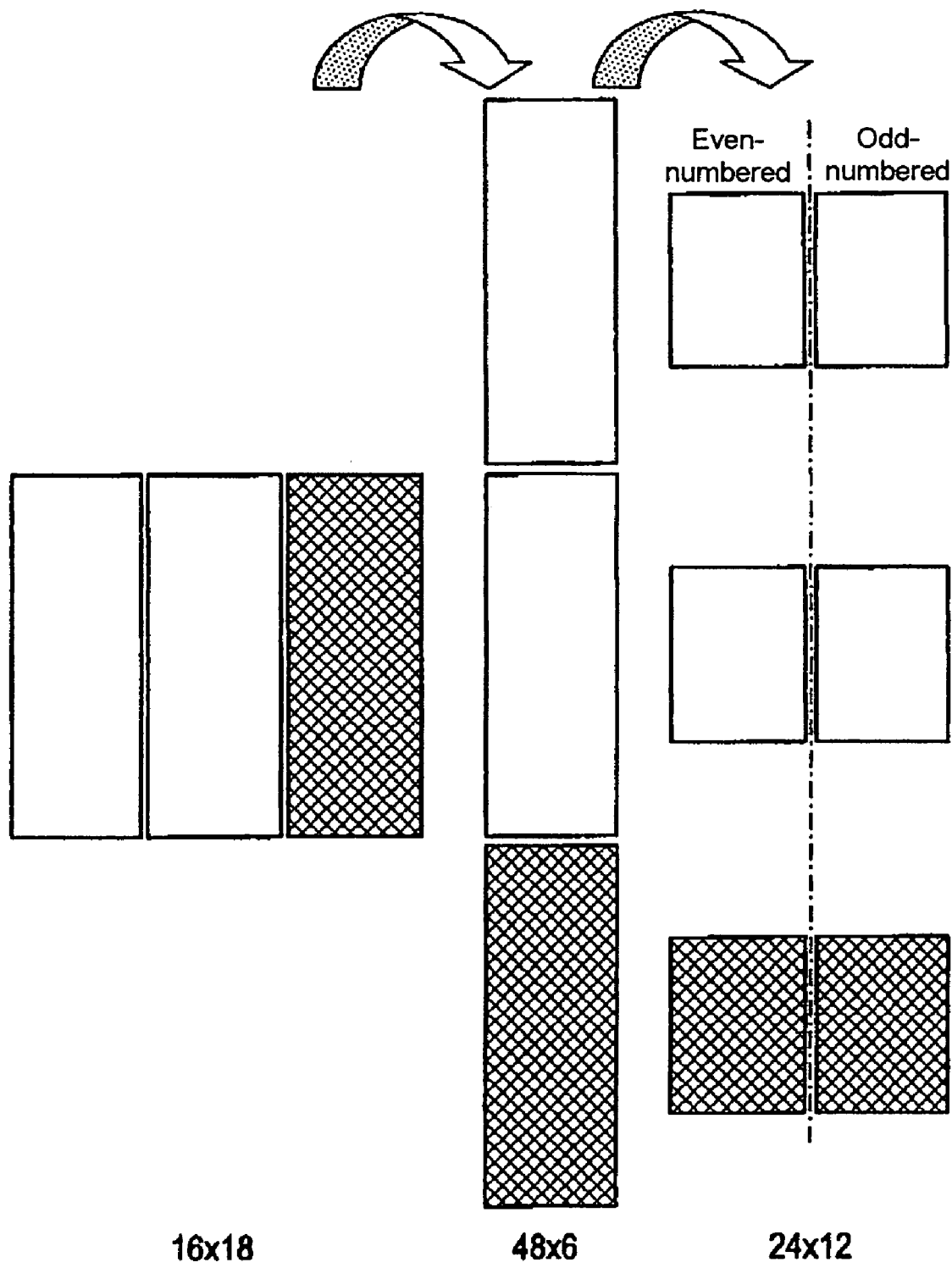
FIG. 17 shows a re-ordering scheme of the memory element in the interleaver.

Taking as a starting point the exemplary embodiment of the interleaver which has just been described, and has registers, the memory elements can be re-ordered in such a way that it is possible to obtain a more suitable configuration for an RAM implementation of the interleaver 2. With respect to the illustration in FIG. 16, it is to be noted that the left-hand block of the matrix register is firstly written to, the central block is written to secondly, and finally the right-hand block is written to last. These three blocks are then written to in columns in the aforesaid sequence (see FIG. 17).

Figure 18:
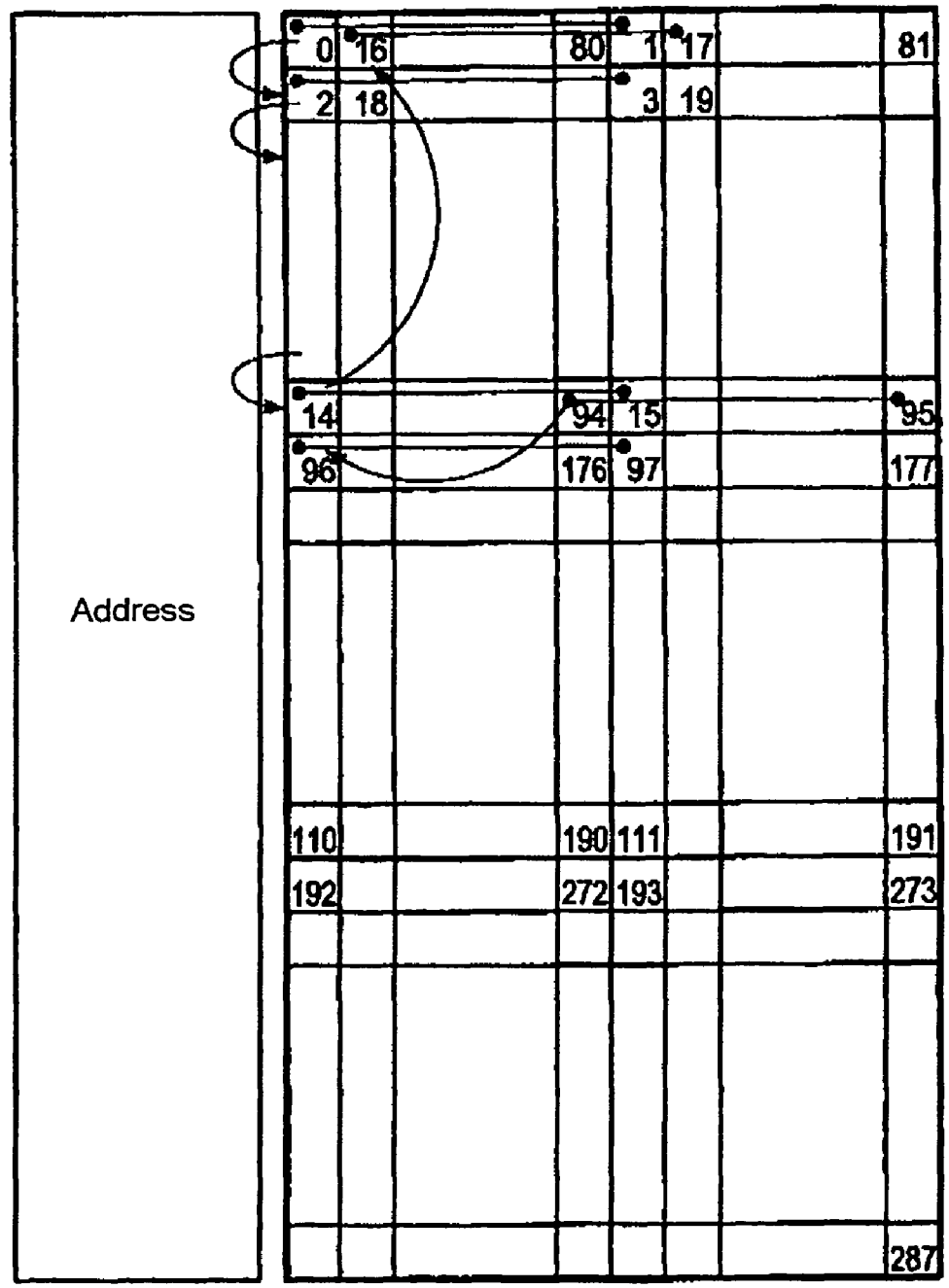
FIG. 18 is a schematic view of a writing phase of the first permutation in the interleaver for an exemplary embodiment of the interleaver with an RAM.

In order to write the two bits which come from the puncturing unit P1, P2 it is necessary to access two rows (or one column) in a cycle. However, with a standard RAM it would be desirable only to access one row per cycle. For this reason, each block is further divided into two columns, one with the even-numbered rows and the second with the odd-numbered rows (see FIG. 17). As a result, the even-numbered bit and the odd-numbered bit which come from the puncturing unit P1, P2 are now on the same row and they can be written simultaneously in a single cycle. Finally, an RAM block with 24 rows and 12 columns is obtained, as shown in FIG. 18. The 64 QAM case is explained below. Taking this as a basis, the expansion to the other modes is then uncomplicated.

It must be possible to write precisely 2 bits into one row of 12 (for example RAM with individual bit writing). At first, we shall concentrate on the first block of 8 rows (that is the left-hand block in the register implementation in FIG. 16). At first, rows are written to from 0 to 7, and the columns 0 and 6 are always written to. In this way, the first 2×8 bits are written to. The rows 0 to 7 are then written to, but this time the columns 1 and 7 etc. up to the bits 94, 95 are always written to. Now, the block of rows is changed and the rows from 8 to 15 are considered, and everything is repeated up to the bit 191. Then, the block is changed for the last time, and the rows from 16 to 23 up to the last bit are processed (see FIG. 18).

Figure 19:
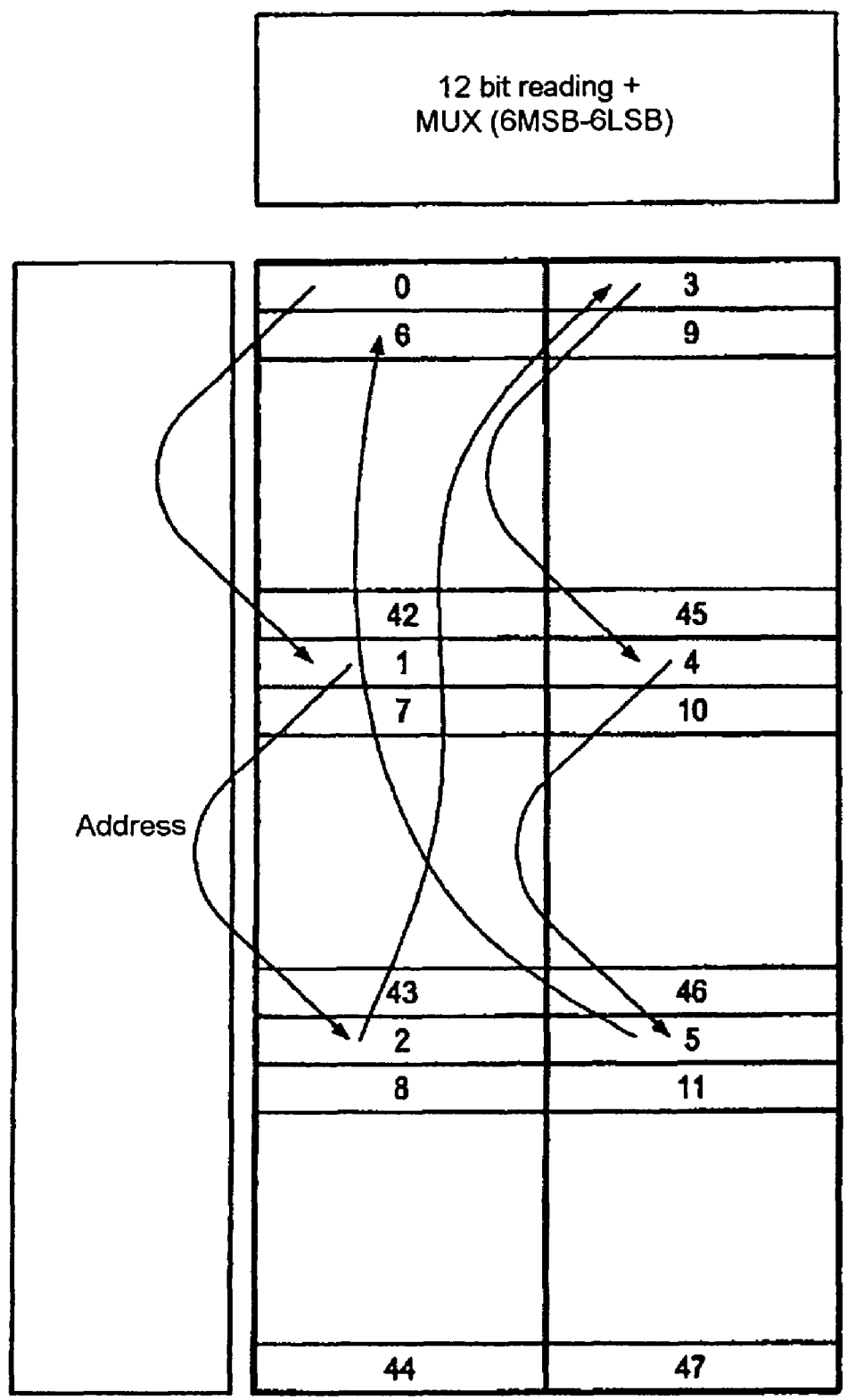
FIG. 19 is a schematic view of a reading phase of the first permutation in the interleaver for an exemplary embodiment of the interleaver with an RAM.

The bits then have to be read in the correct sequence and thus prepared for the second permutation. It is easy to see that the groups of 6 bits have to be fetched from the memory in the sequence illustrated in FIG. 19.

Consequently, the rows with the following addresses have to be read: 0, 8, 16, 0, 8, 16, 1, 9, 17, 1, 9, 17, . . . , 23. The 6 MSB (MSB=Most Significant Bits, bits located on the left) are extracted three times from the 12 bits and the same second permutation scheme is applied. The next time, the 6 LSB (LSB—Least Significant Bits, bits on the right) are extracted and the subsequent second permutation scheme is applied.

As stated above, the explained example relates to the 64 QAM case. It is easy to check that the permutation fills the stated requirements. In addition it is easy to transfer the explained system to BPSK, QPSK and 16 QAM. All that is necessary is to reduce the number of columns during the writing phase, in each case accordingly to the columns (0, 6), (0 . . . 1, 6 . . . 7) and (0 . . . 3, 6 . . . 9).

In summary, the advantage of the RAM embodiment of the interleaver 2 with respect to the register embodiment of the interleaver 2 is that in the RAM embodiment the data bits are not buffered in shift registers but instead the bit pairs are written directly into the RAM at the correct addresses.

As already described above with respect to the depuncturing unit (P2', P1'), also at the receiver end, the standard solution is reconfigured to form a completely parallel solution, as illustrated in the block circuit diagram in FIG. 11. The demapper unit, which is arranged upstream of the de-interleaver 3, supplies the de-interleaver 3 with one carrier per cycle. Each carrier contains 1, 2, 4 or 6 soft bits corresponding to the selected modulation mode (mapping as in FIG. 15). A soft bit is equal to the specific bit plus N−1 reliability bits which have to be processed together up to the Viterbi decoder 4, whose output is a single specific bit. For this reason, in this case, the basic data element is no longer the bit but rather a group of N bits, N typically being equal to 4. At the receiver end, the RAM solution is the preferred embodiment because the necessary memory elements are increased by a factor N. Here too, there is no need for buffering of the (output) bits into (output) shift registers with the RAM solution but instead the bits are read out of the RAM in pairs directly into the depuncturing device (P2', P1').

At the receiver end, the second and the first permutation are carried out inversely.

Figure 20:
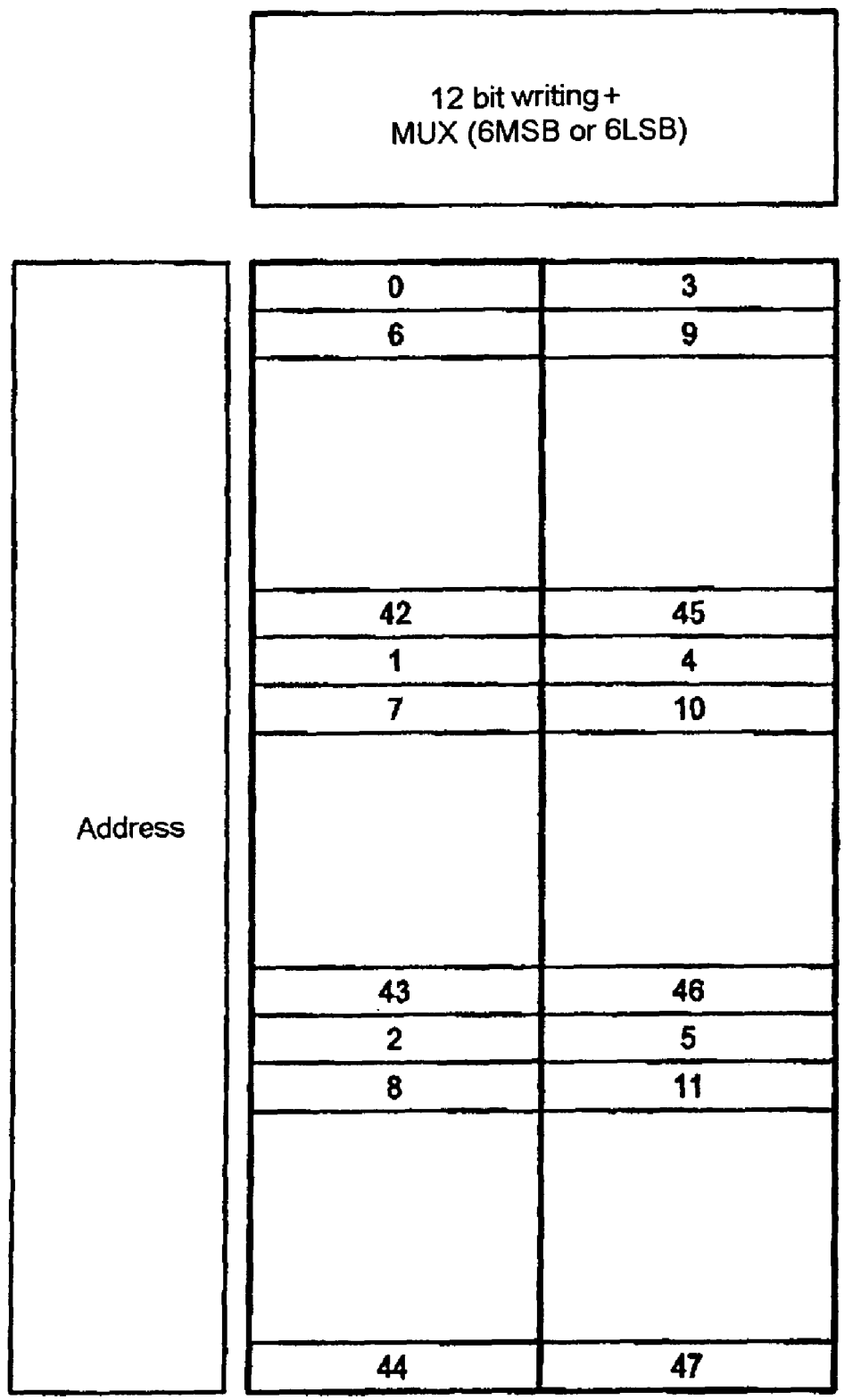
FIG. 20 is a schematic view of an exemplary embodiment of the writing phase during the inversion of the first permutation in the de-interleaver.
Figure 21:
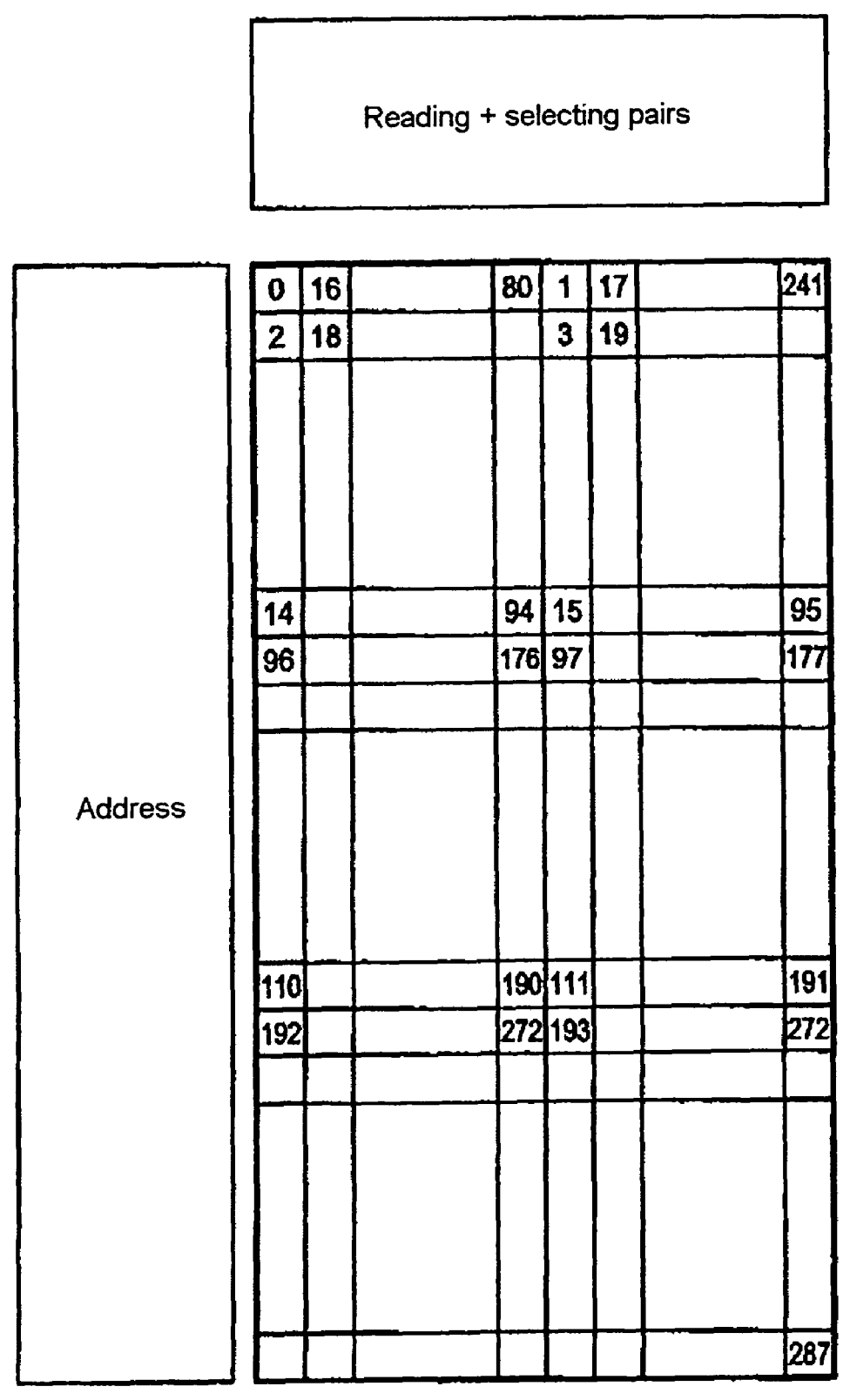

After the inverse of the second permutation has been carried out, each carrier (group of 1, 2, 4 or 6 soft bits corresponding to the modes BPSK, QPSK, 16 QAM or 64 QAM) moves on to carrying out the inverse of the first permutation. Here, it is possible in turn to use an RAM with 24 rows of 12×N bits. The writing phase follows the same scheme as the reading phase at the transmitter end and is illustrated in FIG. 20. The reading phase is shown in FIG. 21 and follows the same scheme as the writing phase at the transmitter end.

The total time which is required to carry out the de-interleaving of an OFDM symbol is 48 cycles for the writing phase for all transmission modes+144 cycles for the reading phase with 64 QAM. In order to facilitate the operation of the depuncturing unit (P2', P1') which is connected downstream of the de-interleaver 3 it is possible to leave a number of gaps between the data during the reading phase (222 cycles). For further details in this respect, reference is made to the above statements on the depuncturing device (P2', P1').

It is just as simple, as has been explained above with respect to the RAM implementation, to implement at the receiver end an inversion of the interleaver register implementation as an exemplary embodiment according to the invention. The data input process, as explained with respect to the register example of the interleaver 2, only has to be reversed into a data output process. At the receiver end, a soft bit column is then read, interleaved in the manner of a comb, from the matrix register into two soft bit shift registers, i.e. two adjacent soft bits are each read into another of the two soft bit shift registers. From the two soft bit shift registers, the outputting of soft bits into the depuncturing device (P2', P1') is respectively carried out in a serial fashion, but in an overall parallel fashion owing to the presence of two soft bit shift registers. As soon as the two soft bit shift registers are empty, a further column is read out from the matrix register into both soft bit shift registers in the same way as in the first column which is read out from the matrix register, and then both soft bit shift registers are simultaneously emptied, and so on.

In terms of hardware, in one exemplary embodiment of the de-interleaver 3 the matrix register is embodied, for example as a 16×(18×N) matrix register, and the two soft bit shift registers are embodied as 8 soft bit shift registers with a word length of N.

In summary, the advantages which are achieved with the solution according to the invention can be summarized as follows:

1) A reduction in delay at the transmitter and at the receiver. The latency or delay is usually a particularly critical parameter for the configuration of a burst transmission system. The latency which is reduced in the puncturing device/depuncturing device P1, P2, P2', P1' and in the interleaver/de-interleaver 2, 3 can consequently be included advantageously in other parts of the burst transmission system, for example in the equalizer or in the synchronization means, in order to be able to implement more powerful algorithms there.
2) A reduction in the space required since a FIFO is no longer required.
3) Furthermore, low clock frequencies are also associated with this. If a WLAN system is implemented with a clock of 80 MHz, i.e. four times the OFDM sampling frequency, according to the invention the data path no longer has to be doubled into odd-numbered/even-numbered OFDM symbols as is necessary according to the prior art.

If one of the exemplary embodiments illustrated above is used at the transmitter end for the transmitter device according to the invention, and one of the exemplary embodiments illustrated above is used at the receiver end for the receiver device according to the invention, an exemplary embodiment for a telecommunications transmission system according to the invention is obtained which may be, for example, a WLAN.

The invention claimed is:

1. An electronic transmitter device comprising:
a puncturing device, wherein the puncturing device comprises:
   a first and a second data output,
   wherein the puncturing device is configured to distribute an output data stream substantially uniformly in parallel between the first and second data outputs,
   wherein the puncturing device is configured to provide empty locations in the output data stream so that a number of bits of an input data stream corresponds, including with the empty locations, to a number of bits of the output data stream,
   wherein the puncturing device is configured to output, in addition to the output data stream, a signal which indicates a position of an empty location in the output data stream; and
an interleaver arranged downstream of the puncturing device in a direction of the output data stream, and comprising:
   a first data input which is directly or indirectly electrically connected to the first data output of the puncturing device;
   a second data input which is directly or indirectly electrically connected to the second data output of the puncturing device;
   an n×m interleaver, n and m being natural numbers;

a first shift register which is directly or indirectly electrically connected to the first data input;
a second shift register which is directly or indirectly electrically connected to the second data input; and
a matrix register;
wherein in each case two bits are written in parallel into the matrix register from the two shift registers.

2. The electronic transmitter device as claimed in claim 1, wherein both of the shift registers are 8-bit shift registers.

3. The electronic transmitter device as claimed in claim 1, wherein the matrix register comprises a 16×18 matrix register.

4. The electronic transmitter device as claimed in claim 1, wherein the interleaver comprises a RAM and is designed in such a way that the bit pairs which pass into the interleaver are written directly to predetermined RAM addresses.

5. The electronic transmitter device as claimed in claim 1, wherein the puncturing device comprises one puncturing element.

6. The electronic transmitter device as claimed in claim 1, wherein the puncturing device comprises a first puncturing element and a second puncturing element which is arranged downstream of the first puncturing element in the direction of the data stream.

7. The electronic transmitter device as claimed in claim 6, wherein:
the first puncturing element comprises a first and a second data output and is configured in such a way that it distributes its output data stream substantially uniformly between its two data outputs, and
the second puncturing element comprises a first and a second data input, the first data input of the second puncturing element being directly or indirectly electrically connected to the first data output of the first puncturing element, and the second data input of the second puncturing element being directly or indirectly electrically connected to the first data output of the first puncturing element.

8. The electronic transmitter device as claimed in claim 6, wherein the second puncturing element comprises two data outputs.

9. The electronic transmitter device as claimed in claim 8, wherein the two data outputs of the second puncturing element are simultaneously the two data outputs of the puncturing device.

10. An electronic transmitter device comprising:
a puncturing device, wherein the puncturing device comprises:
a first and a second data output,
wherein the puncturing device is configured to distribute an output data stream substantially uniformly in parallel between the first and second data outputs;
wherein the puncturing device is configured to provide empty locations in the output data stream so that a number of bits of an input data stream corresponds, with the empty locations, to a number of bits of the output data stream;
wherein the puncturing device is still further configured to output, in addition to the output data stream, a signal which indicates a position of an empty location in the output data stream; and
an interleaver arranged downstream of the puncturing device in a direction of the output data stream, and comprising:
a first data input which is directly or indirectly electrically connected to the first data output of the puncturing device;
a second data input which is directly or indirectly electrically connected to the second data output of the puncturing device;
an n×m interleaver, n and m being natural numbers;
a first shift register which is directly or indirectly electrically connected to the first data input;
a second shift register which is directly or indirectly electrically connected to the second data input; and
a matrix register;
wherein in each case two bits are written in parallel into the matrix register from the two shift registers;
wherein after the two shift registers have been completely filled by inputs via the corresponding data inputs of the interleaver, their bits are input together as a bit column into the matrix register, interleaved in the manner of a comb, and in this way the bits gradually fill up a plurality of, or all of, the columns of the matrix register.

11. An electronic transmitter device comprising:
a puncturing device, wherein the puncturing device comprises:
a first and a second data output,
wherein the puncturing device is configured to distribute an output data stream substantially uniformly in parallel between the first and second data outputs;
wherein the puncturing device is configured to provide empty locations in the output data stream so that a number of bits of an input data stream corresponds, with the empty locations, to a number of bits of the output data stream;
wherein the puncturing device is configured to output, in addition to the output data stream, an indication signal which indicates a position of an empty location in the output data stream;
an interleaver arranged downstream of the puncturing device in a direction of the output data stream, and comprising:
a first data input which is directly or indirectly electrically connected to the first data output of the puncturing device, and
a second data input which is directly or indirectly electrically connected to the second data output of the puncturing device;
wherein the interleaver is configured in such a way that, using the indication signal which is additionally transmitted by the puncturing device, the interleaver detects the empty locations in the parallel input data stream coming from the puncturing device, and does not include them in the further data processing.

12. An electronic transmitter device comprising:
a puncturing device, wherein the puncturing device comprises:
a first and a second data output,
wherein the puncturing device is configured to distribute an output data stream substantially uniformly in parallel between the first and second data outputs;
wherein the puncturing device is configured to provide empty locations in the output data stream so that a number of bits of an input data stream corresponds, with the empty locations, to a number of bits of the output data stream;
wherein the puncturing device is configured to output, in addition to the output data stream, an indication signal which indicates a position of an empty location in the output data stream;
wherein the puncturing device comprises a first puncturing element and a second puncturing element which is arranged downstream of the first puncturing element in the direction of the data stream;

wherein the first puncturing element comprises a first and a second data output and is configured in such a way that it distributes its output data stream substantially uniformly between its two data outputs;

wherein the second puncturing element comprises a first and a second data input, the first data input of the second puncturing element being directly or indirectly electrically connected to the first data output of the first puncturing element, and the second data input of the second puncturing element being directly or indirectly electrically connected to the first data output of the first puncturing element;

wherein:

the first puncturing element is configured in such a way that, in addition to wherein the parallel output data stream, the first puncturing element transmits to the second puncturing element the indication signal which informs the second puncturing element about empty locations in the parallel output data stream of the first puncturing element, and the second puncturing element is configured in such a way that, using the indication signal which is additionally transmitted by the first puncturing element, the second puncturing element detects the empty locations in the parallel input data stream coming from the first puncturing element, and does not include them in the further data processing.

13. An electronic transmitter device comprising:

a first puncturing element comprising:

a first and a second data output, wherein the first puncturing element is configured in such a way that it distributes an output data stream substantially uniformly between the first and second data outputs and is further configured to provide empty locations in the output data stream so that a number of bits of an input data stream corresponds, with the empty locations, to a number of bits of the output data stream;

wherein the first puncturing element comprises a first data input and a second data input, and is configured in such a way that a 1-step delay register is connected between the first data input and the first data output, the second data input is electrically connected to a first input of a multiplexer via a 1-step delay register, and in parallel with this the second data input is directly electrically connected to a second input of a multiplexer, and the multiplexer has an output which is electrically connected to the second data output of the first puncturing element via a further 1-step delay register.

14. The electronic transmitter of claim 13, comprising:

a second puncturing element which is arranged downstream of the first puncturing element in the direction of the data stream.

15. The electronic transmitter of claim 14, wherein the second puncturing element comprises a first and a second data input, the first data input of the second puncturing element being directly or indirectly electrically connected to the first data output of the first puncturing element, and the second data input of the second puncturing element being directly or indirectly electrically connected to the first data output of the first puncturing element.

16. The electronic transmitter of claim 14, wherein the second puncturing element comprises a first and a second data output and is configured in such a way that it distributes an output data stream substantially uniformly in parallel between the first and second data outputs.

17. The electronic transmitter of claim 16, wherein the second puncturing element is configured to provide empty locations in the output data stream so that a number of bits of an input data stream corresponds, including the empty locations, to a number of bits of the output data stream.

18. The electronic transmitter of claim 16, wherein the second puncturing element is configured to output, in addition to the output data stream, a signal which indicates a position of an empty location in the output data stream.

19. An electronic transmitter device comprising:

a puncturing device, wherein the puncturing device comprises:

a first and a second data output, wherein the puncturing device is configured to distribute an output data stream substantially uniformly in parallel between the first and second data outputs;

wherein the puncturing device is configured to provide empty locations in the output data stream so that a number of bits of an input data stream corresponds, with the empty locations, to a number of bits of the output data stream;

wherein the puncturing device is configured to output, in addition to the output data stream, an indication signal which indicates a position of an empty location in the output data stream;

wherein the puncturing device comprises a first puncturing element and a second puncturing element which is arranged downstream of the first puncturing element in the direction of the data stream;

wherein the second puncturing element comprises a first data output and a second data output;

wherein:

the second puncturing element comprises three multiplexers which each have two inputs and one output, the first data input of the second puncturing element is directly electrically connected both to the first input of the first multiplexer of the second puncturing element and to the first input of the second multiplexer of the second puncturing element the second data input of the second puncturing element is directly electrically connected both to the second input of the first multiplexer of the second puncturing element and to the second input of the second multiplexer of the second puncturing element, the output of the first multiplexer of the second puncturing element is directly electrically connected to the first input of the third multiplexer of the second puncturing element, the output of the first multiplexer of the second puncturing element is electrically connected via a 1-step delay register to the second input of the third multiplexer of the second puncturing element, the output of the third multiplexer of the second puncturing element is electrically connected via a 1-step delay register to the first data output of the second puncturing element, and the output of the second multiplexer of the second puncturing element is electrically connected via a further 1-step delay register to the second data output of the second puncturing element.

* * * * *